US 7,770,149 B2

(12) United States Patent
Akimoto et al.

(10) Patent No.: US 7,770,149 B2
(45) Date of Patent: *Aug. 3, 2010

(54) SEMICONDUCTOR DEVICE, SYSTEM FOR PERFORMING DATA PROCESSING, AND METHOD FOR PERFORMING COMMUNICATION BETWEEN SOFTWARE FRAMEWORK AND PLURALITY OF SOFTWARE MODULES

(75) Inventors: Sae Akimoto, Yokohama (JP);
Masayuki Hagiwara, Yokohama (JP);
Hirotomo Kobayashi, Shinagawa-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1133 days.

This patent is subject to a terminal disclaimer.

(21) Appl. No.: 11/411,944

(22) Filed: Apr. 27, 2006

(65) Prior Publication Data

US 2006/0248223 A1    Nov. 2, 2006

(30) Foreign Application Priority Data

Apr. 28, 2005   (JP) ............................. 2005-133581

(51) Int. Cl.
*G06F 9/44* (2006.01)
(52) U.S. Cl. ................... 717/107; 717/104; 717/120; 707/713; 707/718; 707/763; 715/961; 715/966; 710/1; 710/107
(58) Field of Classification Search ......... 717/102–104, 717/107, 141, 151, 120; 707/5, E17.014, 707/3, E17.032, E17.108, 713, 718, 763, 707/E17.061; 715/966, 744, 961; 710/105, 710/107, 1; 714/38; 709/229, 222
See application file for complete search history.

(56) References Cited

U.S. PATENT DOCUMENTS

| 5,930,808 | A  | * | 7/1999 | Yamanaka et al. ........... 715/205 |
| 5,931,928 | A  | * | 8/1999 | Brennan et al. ............... 710/68 |
| 5,951,649 | A  | * | 9/1999 | Dobbins et al. ............. 709/238 |
| 6,601,058 | B2 | * | 7/2003 | Forster et al. ....................... 1/1 |
| 6,724,875 | B1 | * | 4/2004 | Adams et al. .......... 379/201.01 |
| 6,996,832 | B2 | * | 2/2006 | Gunduc et al. .............. 719/331 |
| 7,039,919 | B1 | * | 5/2006 | Hunt .......................... 719/316 |
| 7,055,142 | B2 | * | 5/2006 | Meredith et al. ............ 717/136 |

(Continued)

FOREIGN PATENT DOCUMENTS

JP         7-20798         1/1995

(Continued)

OTHER PUBLICATIONS

Translation of Patents of Japan, Publication No. 2005-038251, publication date: Feb. 10, 2005, Inventor: Yoshida Minoru.*

(Continued)

*Primary Examiner*—Chameli C Das
(74) *Attorney, Agent, or Firm*—Oblon, Spivak, McClelland, Maier & Neustadt, L.L.P.

(57) ABSTRACT

A framework registers the entry names of entry interfaces respectively included in modules. The framework acquires operation names (static entries) of operation interfaces included in the module by calling the entry interface based on the entry name. The framework calls the operation interfaces based on the operation names. And the module executes generation of the module itself to be connected to the framework, a process inherent in the module, and deletion of the module itself connected to the framework.

21 Claims, 19 Drawing Sheets

U.S. PATENT DOCUMENTS

| | | | |
|---|---|---|---|
| 7,127,701 B2 * | 10/2006 | Fables et al. | 717/104 |
| 7,137,100 B2 * | 11/2006 | Iborra et al. | 717/106 |
| 7,219,327 B1 * | 5/2007 | Jacobs et al. | 717/104 |
| 7,280,529 B1 * | 10/2007 | Black et al. | 370/352 |
| 7,287,037 B2 * | 10/2007 | An et al. | 707/102 |
| 7,493,630 B2 * | 2/2009 | Hunt | 719/330 |
| 7,502,803 B2 * | 3/2009 | Culter et al. | 1/1 |
| 7,562,369 B1 * | 7/2009 | Salamone et al. | 719/328 |
| 7,660,973 B2 * | 2/2010 | Hansen et al. | 712/222 |
| 2002/0087918 A1 * | 7/2002 | Miura et al. | 714/38 |
| 2003/0212540 A1 * | 11/2003 | Meredith et al. | 704/4 |
| 2004/0103073 A1 * | 5/2004 | Blake et al. | 707/1 |
| 2004/0143567 A1 * | 7/2004 | Dettinger et al. | 707/3 |
| 2004/0243978 A1 * | 12/2004 | Walmsley | 717/120 |
| 2005/0268038 A1 * | 12/2005 | Yasue | 711/118 |
| 2006/0041661 A1 * | 2/2006 | Erikson et al. | 709/225 |
| 2006/0074695 A1 * | 4/2006 | Houston et al. | 705/1 |
| 2006/0265696 A1 * | 11/2006 | Mayfield et al. | 717/137 |
| 2008/0209391 A1 * | 8/2008 | Iborra et al. | 717/105 |
| 2009/0157639 A1 * | 6/2009 | Dettinger et al. | 707/3 |

FOREIGN PATENT DOCUMENTS

JP     2005-38251     2/2005

OTHER PUBLICATIONS

Title: Memory Requirements for query execution in highly constrained devices, author: Anciaux et al, publication date: Sep. 2003, source: ACM.*

Machine translation of JP-2003- 108370, published on 2003.*

* cited by examiner

FIG. 3

| ENTRY INTERFACE | | |
|---|---|---|
| Entry interface | MXXX_QueryInterface() | INTERFACE ACQUISITION, MODULE ENTRY ADDRESS |
| OPERATION INTERFACE | | |
| Property interface | Property() | PROPERTY ACQUISITION/SETUP; VARIOUS INFORMATION ACQUISITION/SETUP |
| Open interface | Open() | MODULE INITIALIZATION/OPEN |
| TranslateData interface | TranslateData() | DATA CONVERSION |
| Close interface | Close() | MODULE CLOSE |

FIG. 21

FUNCTION POINTERS OF OPERATION INTERFACES ARE DECLARED
WITH ARRAY IN PLUG-IN INTERFACE SIDE
ARRAY OF FUNCTION POINTERS

```
STATIC void (* const pfApiFuncTable[])(void) =
{
/* 0 */      (void (*)(void))Open,
/* 1 */      (void (*)(void))Property,
/* 2 */      (void (*)(void))TransrateData,
/* 3 */      (void (*)(void))Close,
             NULL
};
```

ENTRY INTERFACE RETURNS START POINTER OF ARRAY OF FUNCTION
POINTERS OF OPERATION INTERFACE
DEFINITION OF ENTRY INTERFACE FUNCTION

```
void (* const *query_interface(void))(void)
{
      return(pfApiFuncTable);
}
```

ACTUAL PROCESS OF OPERATION INTERFACE
DEFINITION OF OPERATION INTERFACE FUNCTION

```
int Open(void **handle,void *env_area,int env_size)
{
     :
         /* PROCESS OF Open */
     :
} int Close(void *handle)
{
     :
         /* PROCESS OF Close */
     :
} int TranslateData(void handle,char input_buffer,int *input_buffer_size_list,int
number_of_input_data,char **output_buffer,int *output_buffer_size_list,int *number_of_output_data)
{
     :
         /* PROCESS OF TranslateData */
     :
} int Property(void *handle,char *data_command,char *return_value,void **pointer_value) */
{
     :
         /* PROCESS OF Property */
     :
}
```

FLOW OF INTERFACE ACQUISITION (OPERATION INTERFACE IS ACQUIRED
AS POINTER OF ARRAY)
PLUG-IN INTERFACE SIDE, PART 1

US 7,770,149 B2

SEMICONDUCTOR DEVICE, SYSTEM FOR PERFORMING DATA PROCESSING, AND METHOD FOR PERFORMING COMMUNICATION BETWEEN SOFTWARE FRAMEWORK AND PLURALITY OF SOFTWARE MODULES

RELATED APPLICATION(S)

The present disclosure relates to the subject matter contained in Japanese Patent Application No. 2005-133581 filed on Apr. 28, 2005, which is incorporated herein by reference in its entirety.

FIELD

The present invention relates to a semiconductor device, a system for performing data processing, and a method for performing communication between software framework and a plurality of software modules.

BACKGROUND

Conventionally, in adding software to an application system as plug-in software, the software to be added needs to be modularized and connected to the application system via an interface (see JP-A-2003-108370, for example). The interface is defined individually for each module or defined in common in accordance with the function of the module. However, even in a case where the interfaces are defined in common, each of the modules require a plurality of interfaces because modules grow in sizes and become multifunctional. Therefore, since it becomes possible for a plurality of modules to be connected to a common interface, pointer connectable to each of the plurality of modules is provided with a unique name capable of identifying both the module and the interface thereof. By providing the unique names, the modules becomes connectable to necessary interfaces, however, the number of the unique names increases, and the unique names become more complicated.

SUMMARY

The present invention is directed to a semiconductor device, a system for performing data processing, and method for performing communication between a software framework and a plurality of software modules, which are capable of preventing the unique name of a pointer connectable to an interface of a module from becoming complicated.

The present invention is also directed to a software plug-in method and an application system capable of preventing the unique name of a pointer connectable to an interface of a module from becoming complicated.

According to a first aspect of the invention, there is provided a semiconductor device including: a plurality of data processing modules; a controller that performs a framework process and controls the data processing modules; a memory module that provides a work area for the data processing modules and the controller; and a bus that allows the controller to access to the data processing modules and the memory module. Each of the data processing modules includes: a core module that performs data processing on input data and generates output data; an operation interface that receives the input data and outputs the output data; and a query interface that notifies static entry of the operation interface to the framework process. The controller performs procedures including: registering an entry name of the query interface with respect to each of the data processing modules to the framework process; issuing a query from the framework process to the query interface in any one of the data processing modules based on the registered entry name; obtaining the static entry by the framework process from the query interface; and accessing the operation interface of the data processing modules by the framework process based on the obtained static entry.

According to a second aspect of the invention, there is provided a system for performing data processing, including: a plurality of software modules; a software framework that communicates with the software modules; and a processing unit that performs procedures in accordance with the software framework and the software modules. Each of the software modules includes: a core module for performing data processing on input data and generates output data; an operation interface for receiving the input data and outputting the output data; and a query interface for notifying static entry of the operation interface to the framework process. The software framework causes the processing unit to perform procedures including: registering an entry name of the query interface with respect to each of the data processing modules to the framework process; issuing a query from the framework process to the query interface in any one of the data processing modules based on the registered entry name; obtaining the static entry by the framework process from the query interface; and accessing the operation interface of the data processing modules by the framework process based on the obtained static entry.

According to a third aspect of the invention, there is provided a method for performing communication between a software framework and a plurality of software modules. Each of the software modules includes: a core module for performing data processing on input data and generates output data; an operation interface for receiving the input data and outputting the output data; and a query interface for notifying static entry of the operation interface to the framework process. The method includes: registering an entry name of the query interface with respect to each of the data processing modules to the framework process; issuing a query from the framework process to the query interface in any one of the data processing modules based on the registered entry name; obtaining the static entry by the framework process from the query interface; and accessing the operation interface of the data processing modules by the framework process based on the obtained static entry.

BRIEF DESCRIPTION OF THE DRAWINGS

In the accompanying drawings:

FIG. 3 is a diagram showing a list of interfaces for connecting a software module and a framework according to the first embodiment;

FIG. 21 is a diagram showing an example of definitions of plug-in interfaces according to the fourth embodiment;

DETAILED DESCRIPTION OF THE EMBODIMENTS

Figure 1:
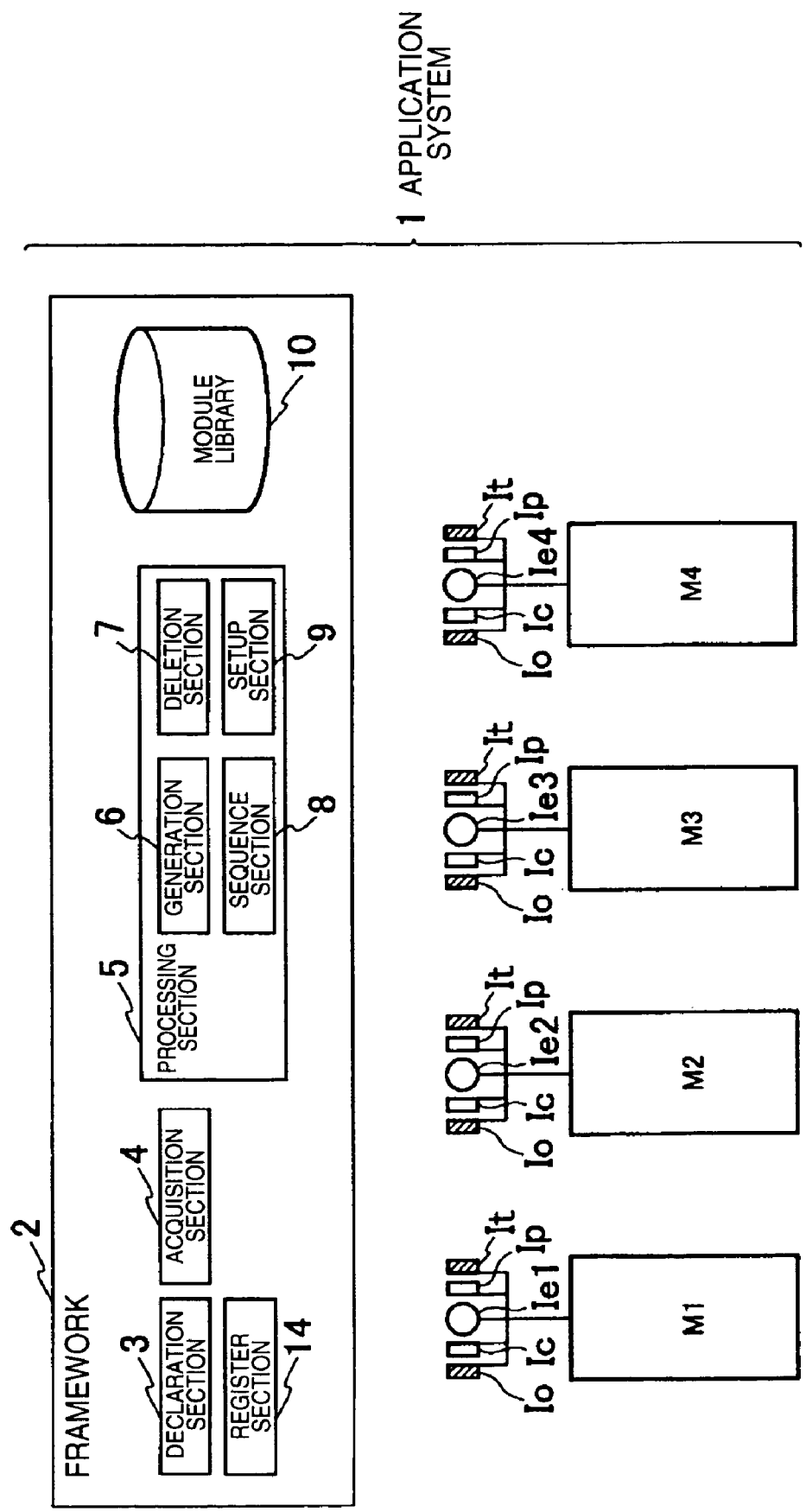
FIG. 1 is a configuration diagram of an application system according to a first embodiment.

Referring now to the accompanying drawings, there are shown embodiments of the invention. In the following description, parts common among embodiments or examples are denoted by the same reference numerals correspondingly, and redundant description will be avoided. Respective diagrams to be referred to are schematic diagrams for explaining the invention and promoting understanding of the invention. For the sake of convenience of illustration in the drawings, there may be differences in shape, size, ratio, etc. from a real apparatus. These differences may be changed on design suitably in consideration of the following description and the known techniques.

First Embodiment

Herein, a system 100 for performing data processing will be described as a first embodiment.

Figure 22:
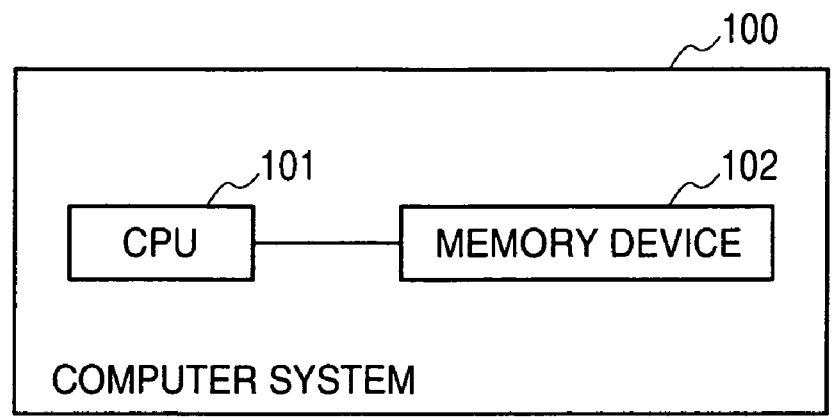
FIG. 22 is a schematic block diagram of a computer system according to the first embodiment.

The system 100 is, as shown in FIG. 22, configured as a computer system that includes a processing unit (CPU) 101 and a memory device 102 that is connected to the CPU 101 and provides a work area for software programs performed by the CPU 101. The system 100 performs an application system 1 shown in FIG. 1.

The application system 1 includes, as shown in FIG. 1, a framework 2 and a plurality of software modules (data processing modules) M1-M4. The framework 2 includes a register section 14, a declaration section 3, an acquisition section 4, a processing section 5, and a module library 10. The processing section 5 includes a generation section 6, a deletion section 7, a sequence section 8, and a setup section 9.

The modules M1-M4 includes an Open interface Io, a Close interface Ic, respective one of entry interfaces (query interfaces) Ie1 through Ie4, a Property interface Ip, and a TranslateData interface It.

Figure 2:
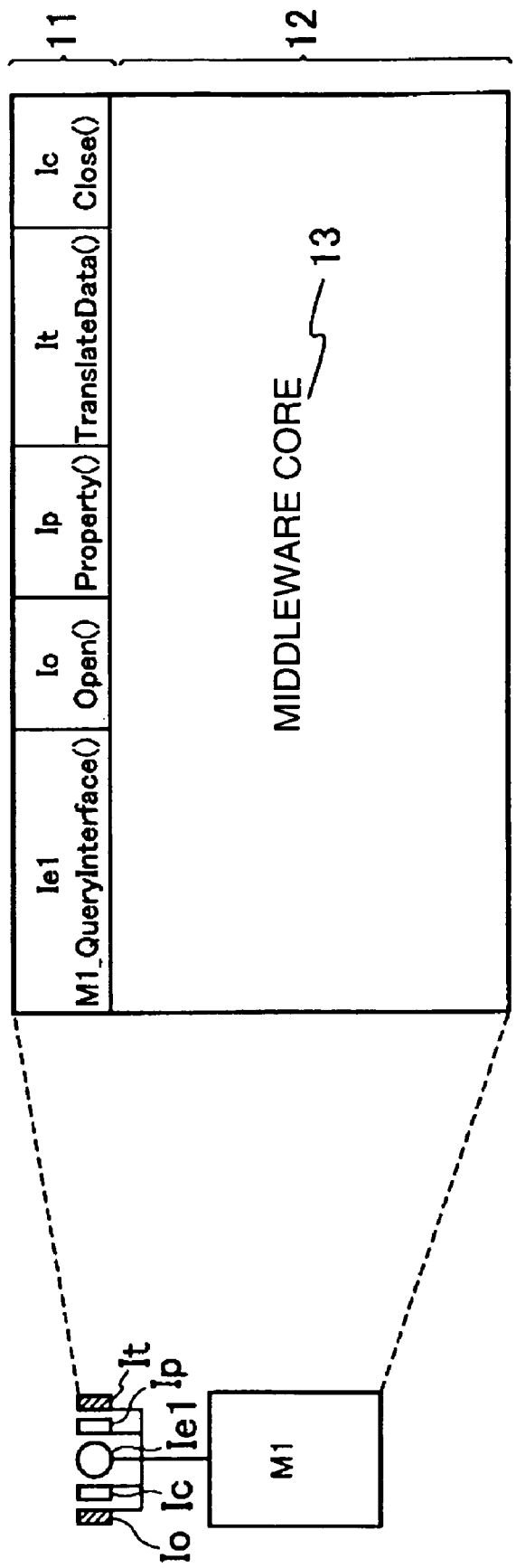
FIG. 2 is a diagram showing a hierarchical structure of a software module according to the first embodiment.

As shown in FIG. 2, the module M1 has a hierarchical structure including an interface layer 11 and a core layer 12 disposed therein. The interface layer 11 is disposed in the top layer of the hierarchical structure, namely the upper layer of the core layer 12. In the interface layer, there are disposed the Open interface Io, the Close interface Ic, the entry interface Ie1, a Property interface Ip, and the TranslateData interface It. In the core layer 12, there is disposed a middleware core (core module) 13, which is software functioning as the module M1. The entry interface Ie1 has a function pointer of M1_QueryInterface( ) as a unique name for the framework 2 to identify the entry interface Ie1. The Open interface Io has a function pointer of Open( ) for the entry interface Ie1 to identify the Open interface Io from the operation interfaces connectable to the module M1. The Property interface Ip has a function pointer of Property( ) for the entry interface Ie1 to identify the Property interface Ip from the operation interfaces connectable to the module M1. The TranslateData interface It has a function pointer of TranslateData( ) for the entry interface Ie1 to identify the TranslateData interface It from the operation interfaces connectable to the module M1. The Close interface Ic has a function pointer of Close( ) for the entry interface Ie1 to identify the Close interface Ic from the operation interfaces connectable to the module M1.

The modules M2 through M4 also have similar hierarchical structures, but have different function pointers of M2_QueryInterface( ) through M4_QueryInterface( ) as the entry names of the entry interfaces Ie2 through Ie4 form the function pointer of M1_QueryInterface( ) of the entry interface Ie1. Note that, if the modules M1-M4 are switched, the function pointers of Property( ), Open( ), Close( ), and TranslateData( ) are not switched, and the same function pointers of Property( ), Open( ), Close( ), and TranslateData( ) are not switched are set.

As shown in FIG. 3, the function pointers of M1_QueryInterface( ) through M4_QueryInterface( ) of the entry interface (query interface) Ie1 through Ie4 allow identification of the modules M1-M4 by MXXX part as in MXXX_QueryInterface( ). Accordingly, the framework 2 can use the function pointer MXXX_QueryInterface( ) as a module entry address allowing selection of either one of the modules M1-M4. And, the entry interfaces Ie1 through Ie4 allow the framework 2 to acquire the operation interfaces Io, Ic, Ip, and It included in the modules M1-M4 to which the entry interfaces Ie1 through Ie4 belong respectively. In order for acquiring the operation interfaces Io, Ic, Ip, and It via the entry interfaces Ie1 through Ie4, it is enough for the framework 2 to identify the operation interfaces Io, Ic, Ip, and It in each of the modules M1-M4, and the function pointers of Property( ), Open( ), Close( ), and TranslateData( ), which are common to the modules M1-M4, can be used.

Figure 4:
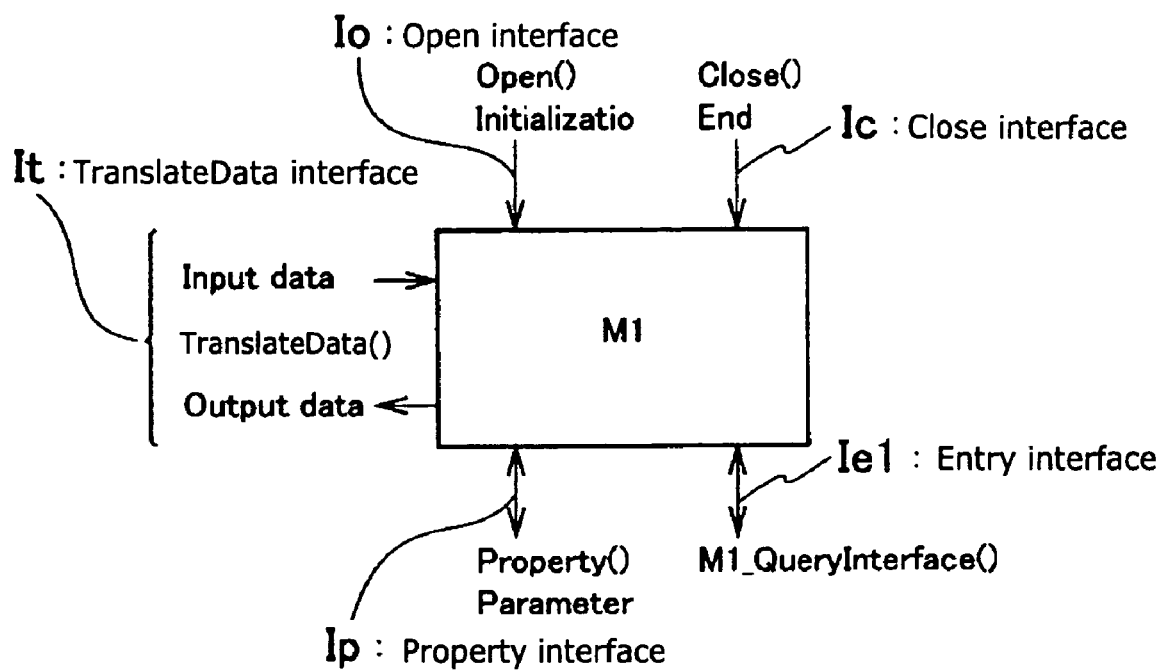
FIG. 4 is a block diagram showing data flow of the software module according to the first embodiment.

As shown in FIG. 4, the modules M1-M4 can be figured out by a block diagram. According to FIGS. 3 and 4, the framework 2 can acquire the Property and various information, including parameter data (Property), from the Module M1 by the Property interface Ip as the operation interface. Further, the framework 2 can also set the Property and the various information to the modules M1-M4 by the Property interface Ip. The framework 2 can initialize (Initialization) the modules M1-M4 by the Open interface Io as the operation interface. Further, the modules M1-M4 can be made open to the framework 2. Accordingly, substances of the modules M1-M4 can be generated in the framework 2.

The parameter data (Property) is expressed by a text character string (character string) or a numerical value (numerical string).

The initialization of the modules is performed by the Open interface Io initializing an environment and a state for the data processing performed by the middleware core (core module) 13. The Open interface Io, when initializing the environment and the state for the data processing, allocates an address space in the memory device 102 and sets parameter data necessary for the data processing to a default value.

The environment and the state used by the data processing is released by the Close interface Ic, when the Close interface Ic terminates the data processing performed by the core module. The Close interface Ic, when releasing the environment and the state for the data processing, releases the address space allocated in the memory device 102.

Figure 5:
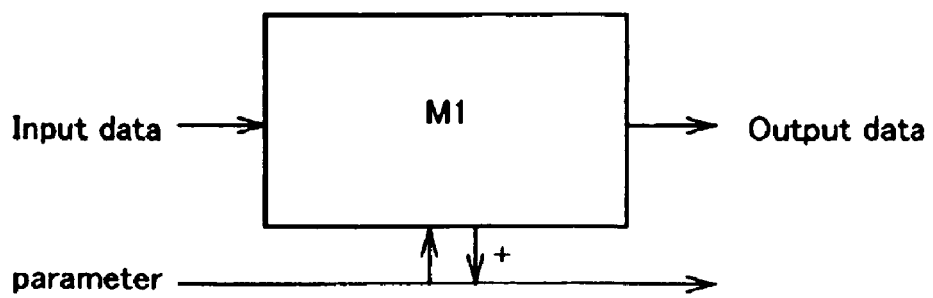
FIG. 5 is a block diagram of a software module functioning as a data conversion module.

The framework 2 can make the modules M1-M4 perform data conversion by the TranslateData interface It as the operation interface. As shown in FIG. 4, the framework 2 inputs Input data, which is input data, to the module M1. The module M1 performs data conversion on the input data Input data to generate output data of Output data. The framework 2 outputs the output data Output data from the module M1. As described above, the modules M1-M4 can be thought to be provided with a function of a typical data converter module as shown in FIG. 5 for outputting output data Output data, which is obtained by performing data conversion on input data Input data in accordance with various information (Parameter).

According to FIGS. 3 and 4, by the Close interface Ic as the operation interface, the framework 2 can make the modules M1-M4 be closed to the framework 2 as a so-called end processing (End) of the plug-in. Accordingly, substances of the modules M1-M4 can be deleted from the framework 2.

Figure 6:
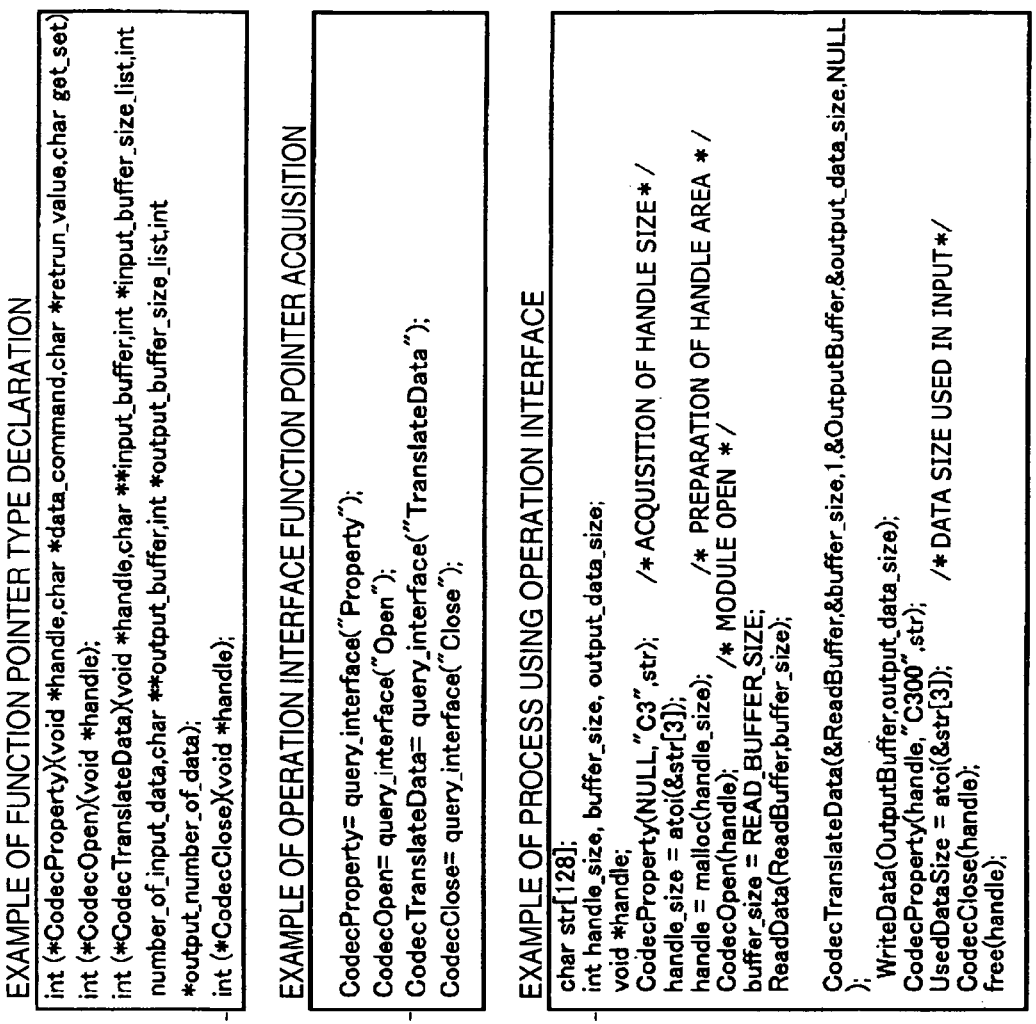
FIG. 6 is a flowchart of a plug-in method according to the first embodiment.

A software plug-in method implemented in the application system 1 shown in FIG. 1 will now be explained. As an example, the case will be explained in which software built in the module M1 is added to the framework 2 as plug-in software, and then software built in the module M2 is subsequently added to the framework 2 as plug-in software. As shown in FIG. 6, in the software plug-in method, firstly in step S1, the register section 14 shown in FIG. 1 registers the function pointer M1_QueryInterface( ) as the entry name of the entry interface Ie1 provided to the software module M1 to the framework 2 based on the module library 10. It becomes possible for the framework 2 to acquire the operation interfaces Io, Ic, Ip, and It by calling the entry interface Ie1 expressed as a function from the function pointer M1_QueryInterface( ).

The declaration section 3 declares function pointer types of the operation interfaces Io, Ic, Ip, and It of the module M1 in step S2 as shown in the example of a function pointer type declaration with C in FIG. 6. Note that, since the input/output processes performed by each of the operation interfaces Io, Ic, Ip, and It can also be thought to be so-called functions, functions of CodecOpen, CodecClose, CodecProperty, and CodecTranslateData corresponding respectively to the operation interfaces Io, Ic, Ip, and It are declared and defined.

Figure 7:
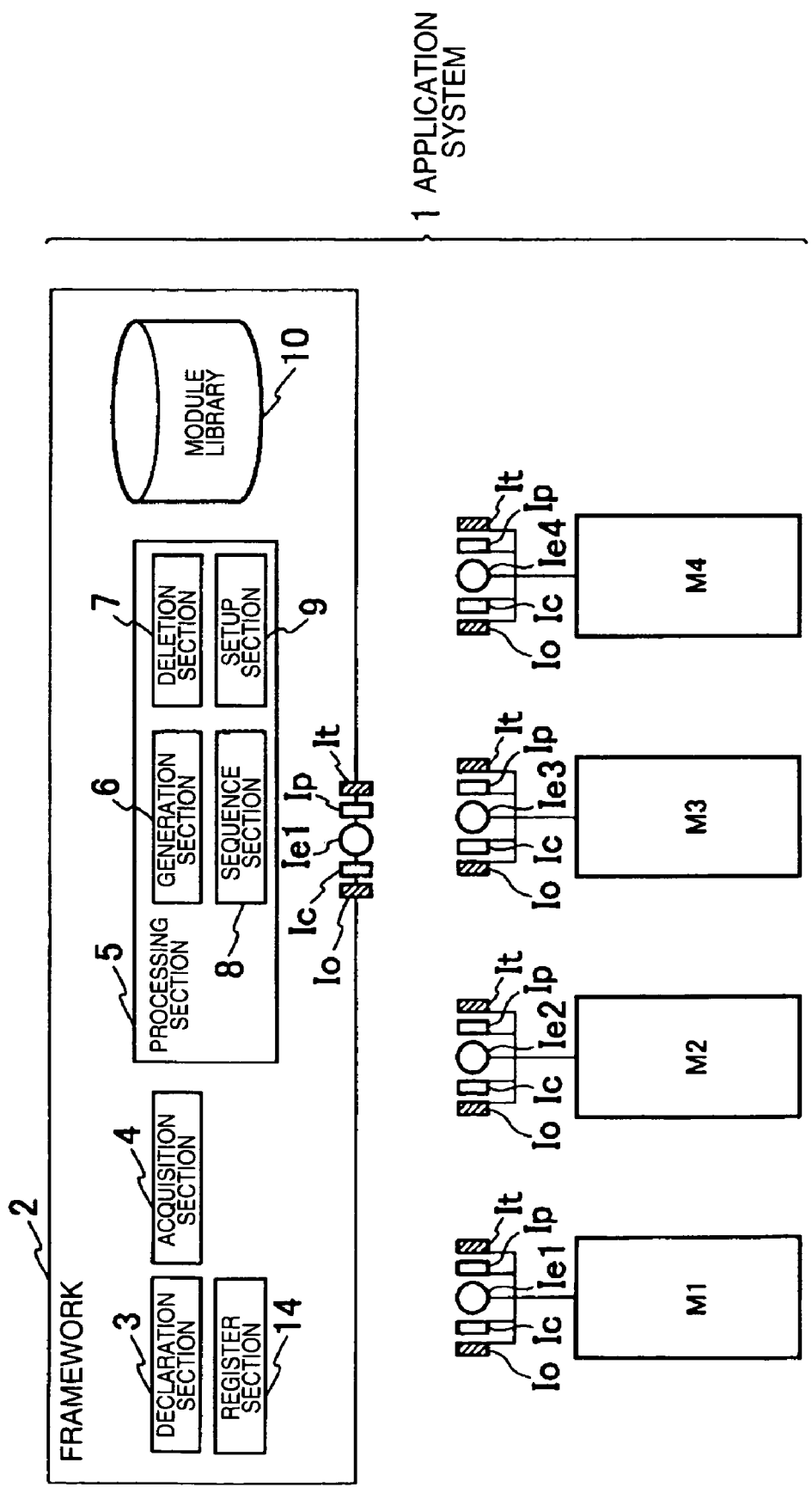
FIG. 7 is a configuration diagram of an application system according to the first embodiment in a midway condition of a plug-in method.

According to these declarations, what kind of output data the framework 2 outputs and what kind of input data the framework 2 inputs are clarified in each of the operation interfaces Io, Ic, Ip, and It, and as shown in FIG. 7, the framework 2 becomes ready for connecting to the interfaces Ie1, Io, Ic, Ip, and It.

Figure 8:
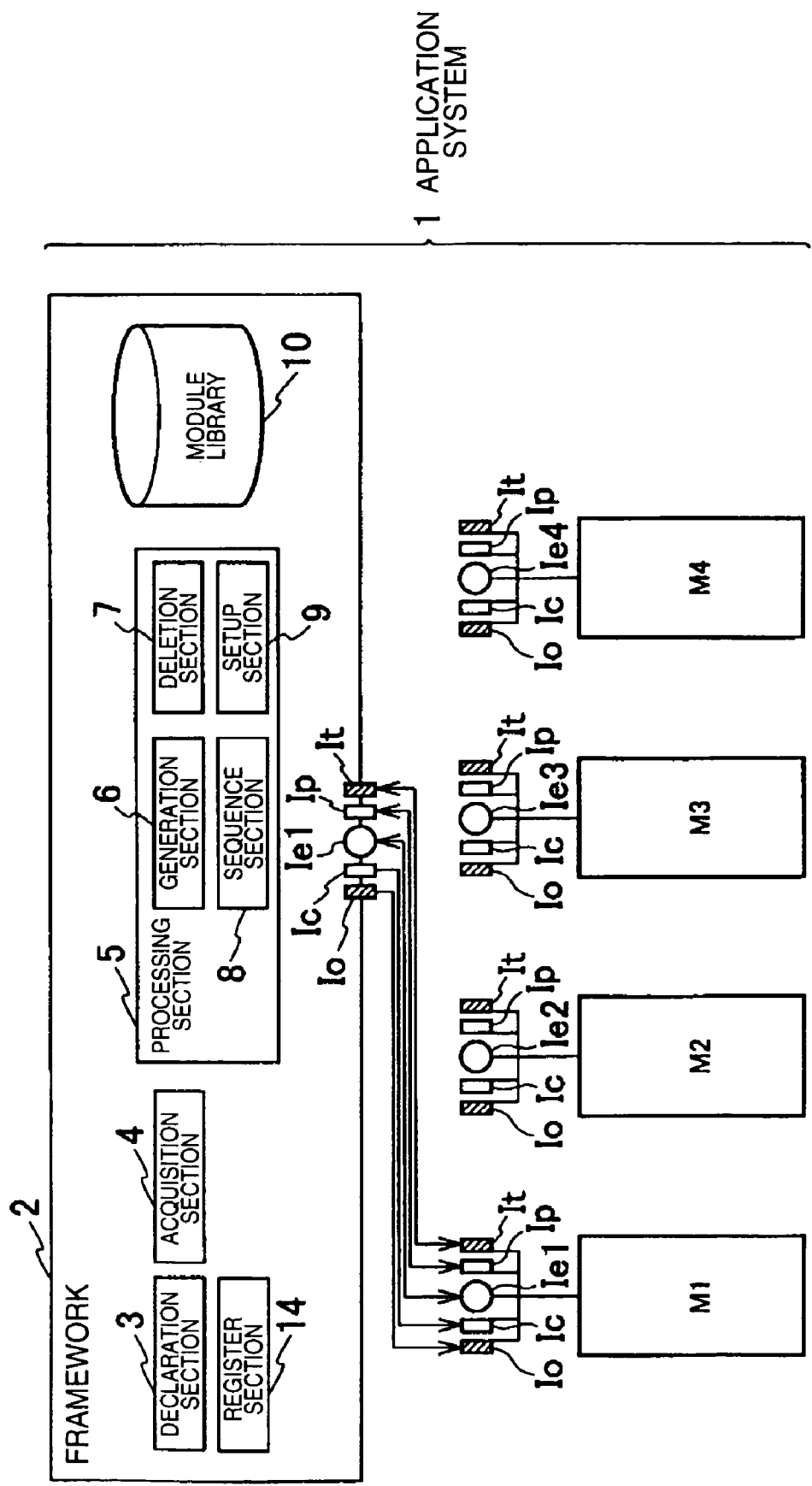
FIG. 8 is a configuration diagram of an application system according to an embodiment in a midway condition of a plug-in method.

In step S3, the acquisition section 4 calls the entry interface Ie1 based on the function pointer M1_QueryInterface( ) of the entry interface Ie1. According to this call operation, the framework 2 acquires the function pointers Open( ), Close( ), Property( ), and TranslateData( ), which are the operation names (static entries) of the operation interfaces Io, Ic, Ip, and It, respectively, provided to the module M1. As a result of this acquisition operation, the framework 2 calls the operation interfaces Io, Ic, Ip, and It based on the function pointers Open( ), Close( ), Property( ), and TranslateData( ), respectively. As shown in FIG. 8, by connecting the operation interfaces Io, Ic, Ip, and It to the framework 2, the module M1 and the framework 2 are connected to each other, and it becomes possible to operate the software of the module M1 under the control of the framework 2. Note that, according to an example of the operation interface function pointer acquisition with C shown in FIG. 6, by storing the argument Open, Close, Property, or TranslateData as the operation name (static entry) in the function query_interface( ) of the entry interface, the framework 2 can acquire the function CodecOpen, CodecClose, CodecProperty, or CodecTranslateData, respectively.

In step S4, the processing section 5 performs an execution process of the software of the module M1 using the operation interfaces Io, Ic, Ip, and It. Under the control of the processing section 5, the module M1 executes generation of the module M1 itself to be connected to the framework 2, a process inherent in the module M1, and deletion of the module M1 itself connected to the framework 2. Step S4 will be explained in further detail.

Figure 9:
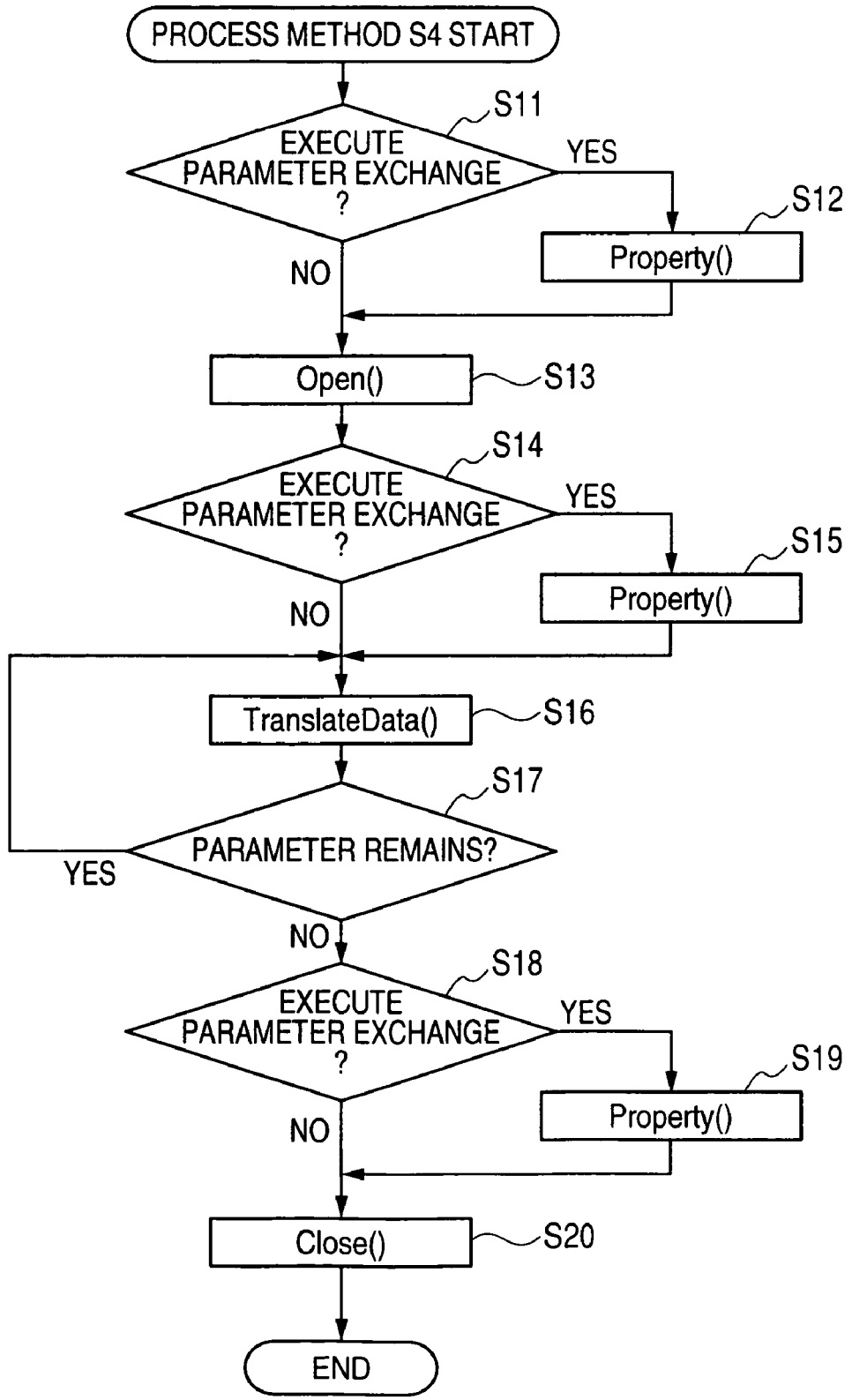
FIG. 9 is a flowchart of a processing method in a plug-in method according to the first embodiment.

As shown in FIG. 9, the sequence section 8 shown in FIG. 1 firstly determines in step S11 whether or not the parameters and the statuses are to be exchanged. In a case where the parameters and the statuses are not to be exchanged, the process proceeds to step S13. In a case where the parameters and the statuses are to be exchanged, the process proceeds to step S12.

In step S12, prior to an execution process by the Open interface Io, the setup section 9 shown in FIG. 1 controls the Property interface Ip to acquire and set the parameters and the statuses of the software of the module M1, thereby making the Open process to be executed later possible. The setup section 9 executes the function calld based on the function pointer Property( ), for example, a function CodecProperty (NULL, "C3",str) . . . in an example of the process using the operation interface shown in FIG. 6.

In step S13, the generation section 6 shown in FIG. 1 calls the function CodecOpen by the function pointer Open( ), and, initializes the module M1, opens the module M1 to the framework 2, and substantializes the module M1, by the Open interface Io. According to this substantiation, the condition in which the module M1 is added to the framework 2 as so-called plug-in, namely, the condition in which the software in the module M1 can be controlled by the framework 2 is established.

In step S14, the sequence section 8 determines whether or not the parameters and the statuses are to be exchanged. In a case where the parameters and the statuses are not to be exchanged, the process proceeds to step S16. In a case where the parameters and the statuses are to be exchanged, the process proceeds to step S15.

In step S15, prior to an execution process by the TranslateData interface It, the setup section 9 controls the Property interface Ip to acquire and set the parameters of the software of the module M1, thereby making the TranslateData process to be executed later possible. Note that in the example of the process using the operation interface shown in FIG. 6, the function CodecProperty is not executed between the function CodecOpen and the function CodecTranslateData.

In step S16, the processing section 5 calls the function CodecTranslateData by the function pointer TranslateData( ), and makes the module M1 execute the process inherent in the module M1, for example, the process of converting the data input thereto and outputting the result, via the TranslateData interface.

In step S17, the sequence section 8 determines whether or not the data to be processed by the software in the module M1 remains in the framework 2. When the data remains, the process proceeds back to step S16, otherwise the process proceeds to step S18.

In step S18, the sequence section 8 determines whether or not the parameters and the statuses are to be exchanged. In a case where the parameters and the statuses are not to be exchanged, the process proceeds to step S20. In a case where the parameters and the statuses are to be exchanged, the process proceeds to step S19.

In step S19, prior to an execution process by the Close interface Ic, the setup section 9 controls the Property interface Ip to acquire and set the parameters and the statuses of the software of the module M1, thereby making the Close process to be executed later possible. Note that in the example of the process using the operation interface shown in FIG. 6, the function CodecProperty(handle, "C300", str) . . . is executed between the function CodecTranslateData and the function CodecClose. Note that the necessary parameter setup or status acquisition (Property( )) can be executed anytime, but not limited in steps of S12, S15, and S19.

In step S20, as the end processing, the deletion section 7 calls the function CodecClose by the function pointer Close( ), disconnects the module M1 from the framework 2 by the Close interface Ic, closes the module M1 to the framework 2, and deletes the module M1 substantialized to the framework 2 as shown in FIG. 1 with respect to FIG. 8. According to this deleting operation, the condition is dissolved in which the module M1 is added to the framework 2 as the plug-in. The process of step S4 in FIG. 6 is thus terminated.

In step S5 in FIG. 6, the sequence section 8 determines whether or not the sequence for achieving the function as the application system 1 shown in FIG. 1 is terminated. If it is not terminated, the process proceeds back to step S1, and if it is terminated, the plug-in method is terminated. Here, the sequence for achieving the function as the application system 1 in FIG. 1 is assumed to be the sequence for executing software of the module M2 in succession to the software of the module M1.

Figure 10:
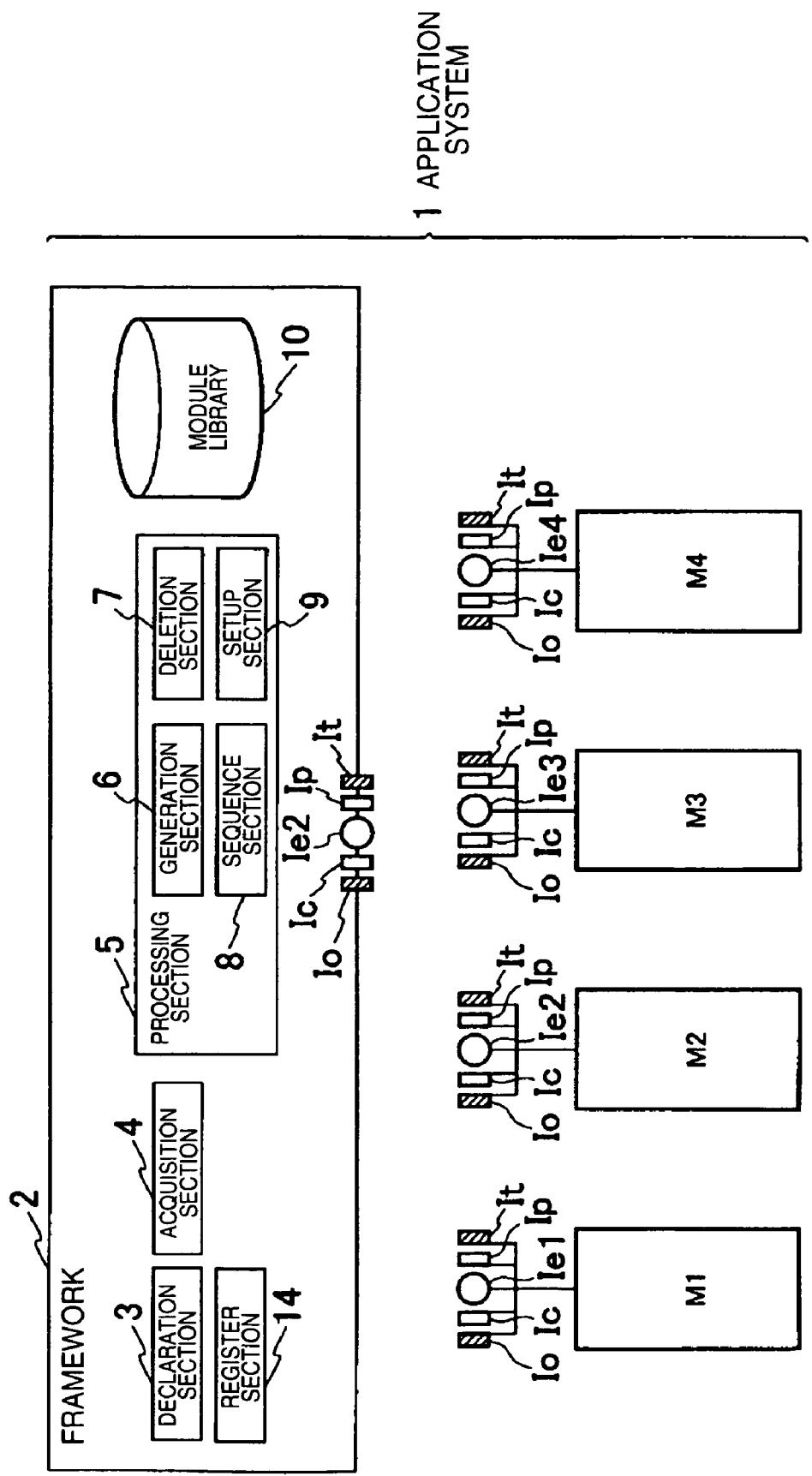
FIG. 10 is a configuration diagram of an application system according to the first embodiment in a midway condition of a plug-in method.

As shown in FIG. 10, similarly to the case with the module M1 in FIG. 7, preparation for connecting to the interfaces Ie2, Io, Ic, Ip, and It is to be done in the framework 2.

In step S1 in FIG. 6, the framework 2 registers the function pointer M2_QueryInterface( ) as the entry name of the entry interface Ie2 provided in the software module M2 based on the module library 10. It becomes possible for the framework 2 to acquire the operation interfaces Io, Ic, Ip, and It of the module M2 by calling the entry interface Ie2 expressed as a function from the function pointer M2_QueryInterface( ).

In step S2, the function pointer types of the operation interfaces Io, Ic, Ip, and It of the module M2 are declared. The functions of CodecOpen, CodecClose, CodecProperty, and CodecTranslateData corresponding to the operation interfaces Io, Ic, Ip, and It, respectively, are declared and defined.

Figure 11:
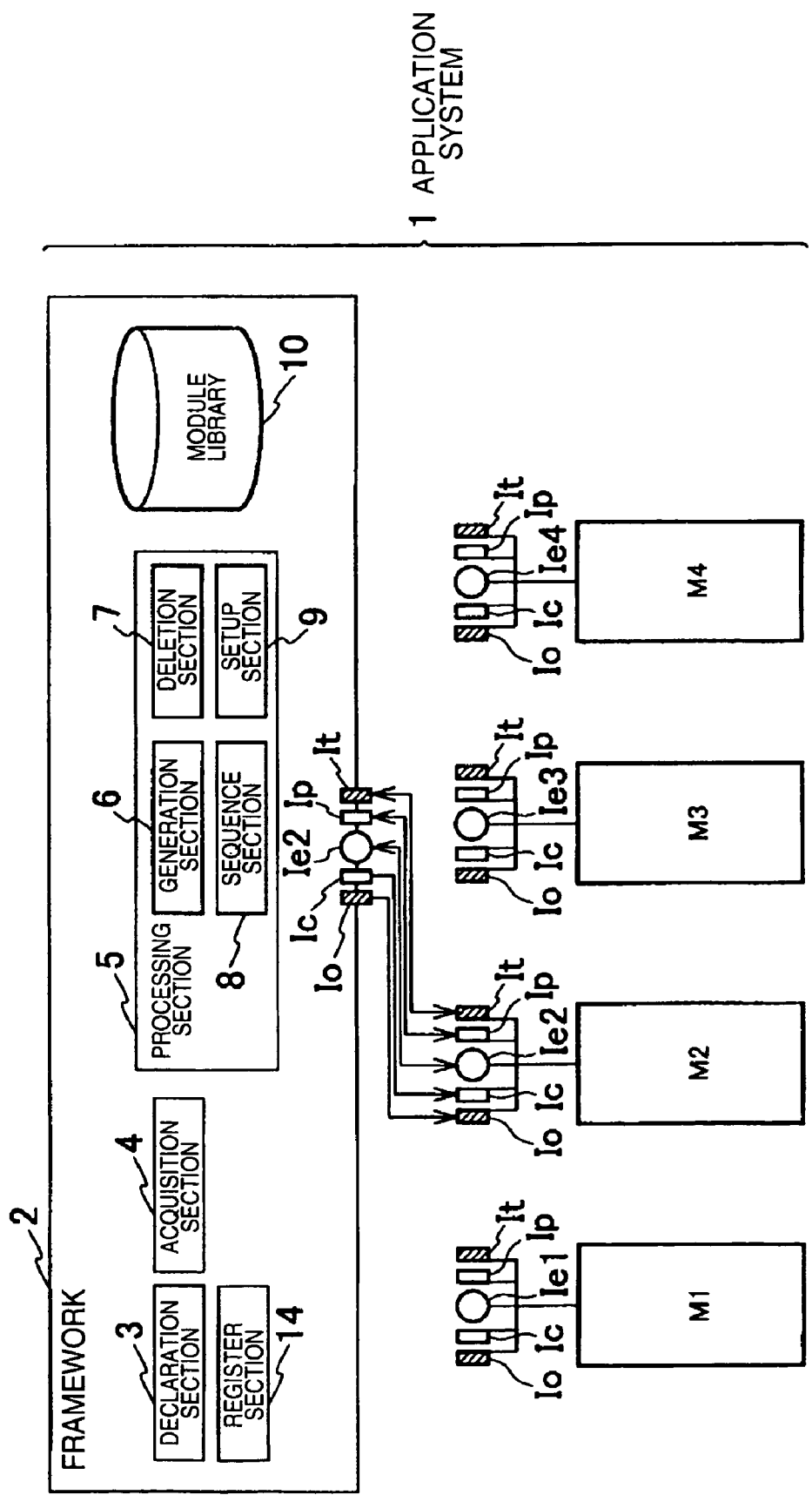
FIG. 11 is a configuration diagram of an application system according to the first embodiment in a midway condition of a plug-in method.

Further, as shown in FIG. 11, similarly to the case with the module M1 in FIG. 8, the interfaces Ie2, Io, Ic, Ip, and It are to be connected to the framework 2.

In step S3 shown in FIG. 6, the entry interface Ie2 is calld based on the function pointer M2_QueryInterface( ) of the entry interface Ie2. According to this call operation, the framework 2 acquires the function pointers Open( ), Close( ), Property( ), and TranslateData( ), which are the operation names (static entries) of the operation interfaces Io, Ic, Ip, and It, respectively, provided to the module M2. As a result of this acquisition operation, the framework 2 calls the operation interfaces Io, Ic, Ip, and It of the module M2 based on the function pointers Open( ), Close( ), Property( ), and TranslateData( ), respectively. By connecting the operation interfaces Io, Ic, Ip, and It to the framework 2, the module M2 and the framework 2 are connected to each other, and it becomes possible to operate the software of the module M2 under the control of the framework 2.

In step S4, an execution process of the software of the module M2 is executed using the operation interfaces Io, Ic, Ip, and It of the module M2. The module M2 executes generation of the module M2 itself to be connected to the framework 2, a process inherent in the module M2, and deletion of the module M2 itself connected to the framework 2.

Figure 12:
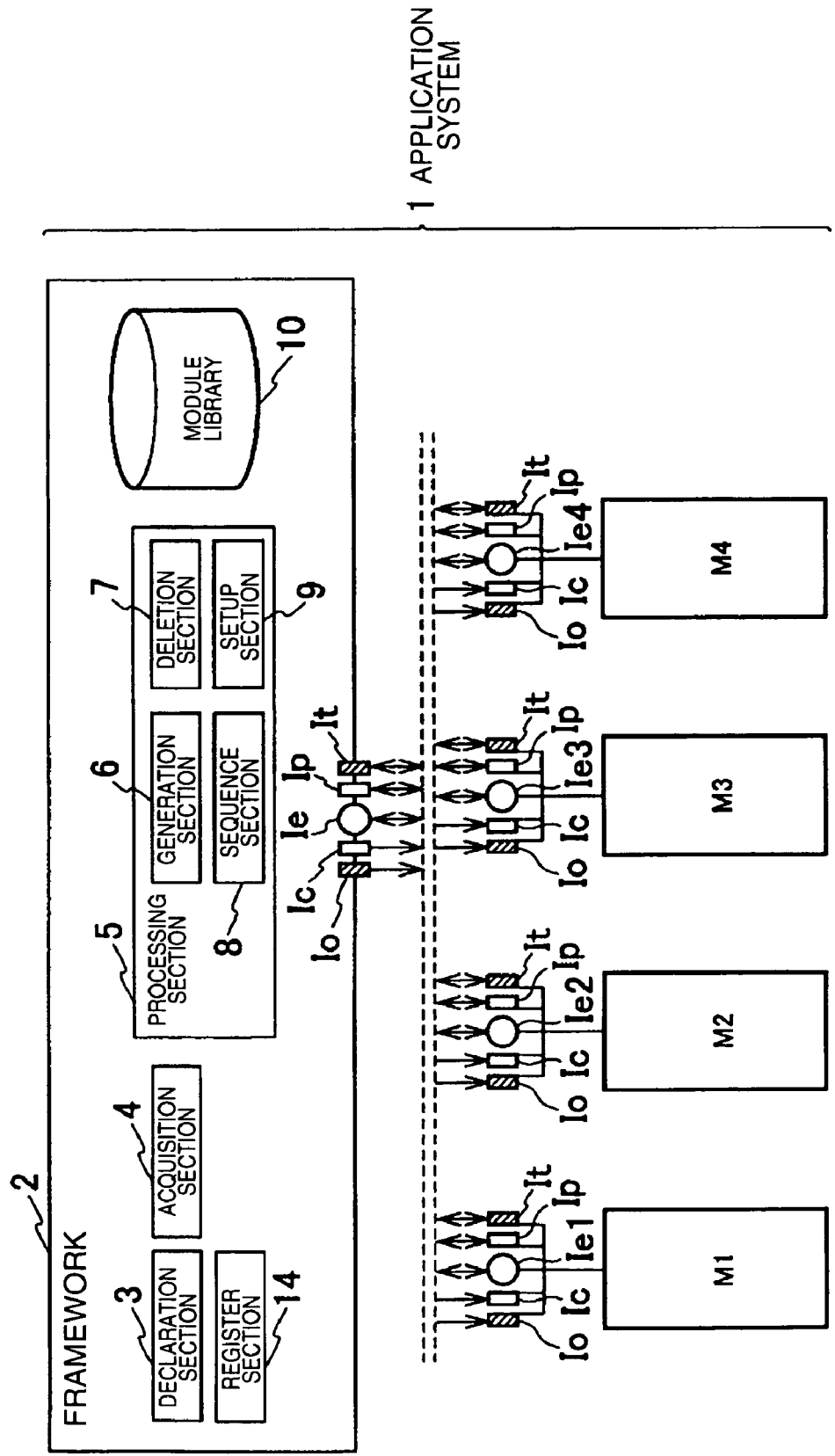
FIG. 12 is a configuration diagram of an application system according to the first embodiment.

As described above, the framework 2 can execute the sequence for executing software of the module M2 in succession to the software of the module M1 as the sequence for achieving the function as the application system 1 in FIG. 1. Accordingly, by preparing the software modules M1-M4 necessary for achieving the function as the application system 1 shown in FIG. 1 and the sequence as an arrangement of the order of the processes by the software of the modules M1-M4 and of the data exchange between the software, as shown in FIG. 12, the framework 2 can dynamically execute a series of substantiation, inherent process, and deletion for each of the modules M1-M4 along the order of the processes of the software of the modules M1-M4 in the sequence. Namely, a series of processes of the substantiation, the inherent process, and the deletion can repeatedly be executed while changing the modules M1-M4 in the order according to the sequence. Accordingly, the application system 1 can achieve the function as the application system 1. Note that since each of the modules M1-M4 is sequentially calld and processed with the substantiation, the inherent process, and the deletion, after deletion of the anterior module in the processing order of the sequence, the entry interface of the posterior module is calld and substantialized.

And, the identification names M1_QueryInterface( ) through M4_QueryInterface( ) of the entry interfaces Ie1 through Ie4 of the modules M1-M4 are specific to each of the modules M1-M4. However, the identification names Open( ), Close( ), Property( ), and TranslateData( ) of the operation interfaces Io, Ic, Ip, and It of the modules M1-M4 are not specific to each of the modules M1-M4, but in common thereto. By thus unifying the identification names of the operation interfaces, the module library 10 does not become complicated with the operation interfaces. Further, the acquisition of the interfaces can also be made common as in the flowcharts shown in FIGS. 6 and 9, which can be made easy to understand and easy to use. This is because a single entry interface, namely each of the entry interfaces Ie1 through Ie4, can cope with four operation interfaces, namely the operation interfaces Io, Ic, Ip, and It. Since each of the modules M1-M4 is only provided with respective one of the entry interfaces Ie1 through Ie4, they can be clarified as the modules M1-M4, and also easily handled. Further, since the operation interfaces Io, Ic, Ip, and It are used in common in the modules M1-M4, they can be registered in the libraries with completely the same interface names of Open( ), Close( ), Property( ), and TranslateData( ), which is easy to understand and is easy to use. The entry interfaces Ie1 through Ie4 and the operation interfaces Io, Ic, Ip, and It can freely be defined in each of the modules M1-M4. Since the entry interfaces Ie1 through Ie4 and the operation interfaces Io, Ic, Ip, and It can dynamically be acquired, it is possible to acquire only necessary ones of the interfaces Ie1 through Ie4, Io, Ic, Ip, and It, thus switching between the modules M1-M4 can easily be performed.

Second Embodiment

Figure 13:
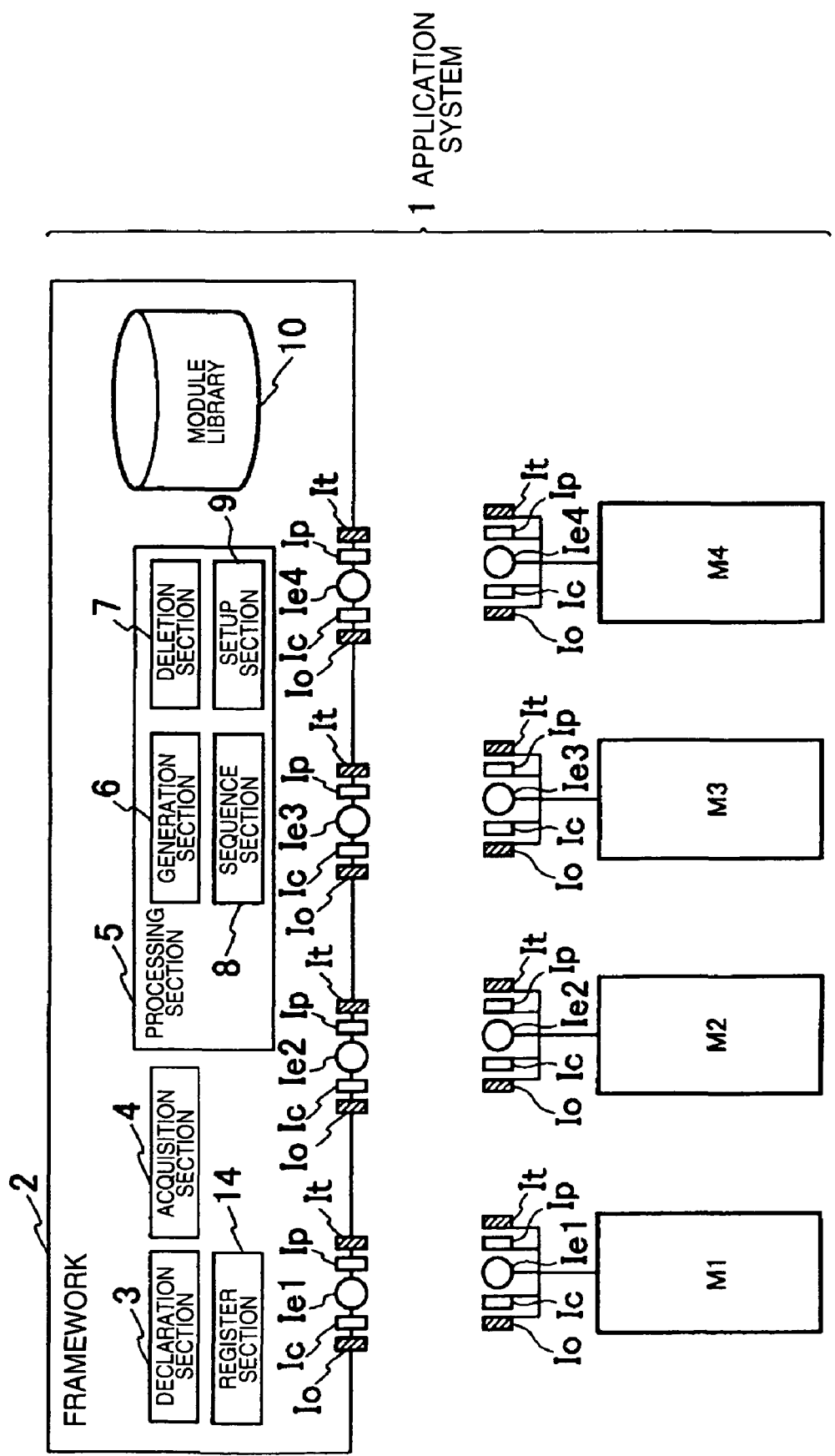
FIG. 13 is a configuration diagram of an application system according to a second embodiment in a midway condition of a plug-in method.
Figure 14:
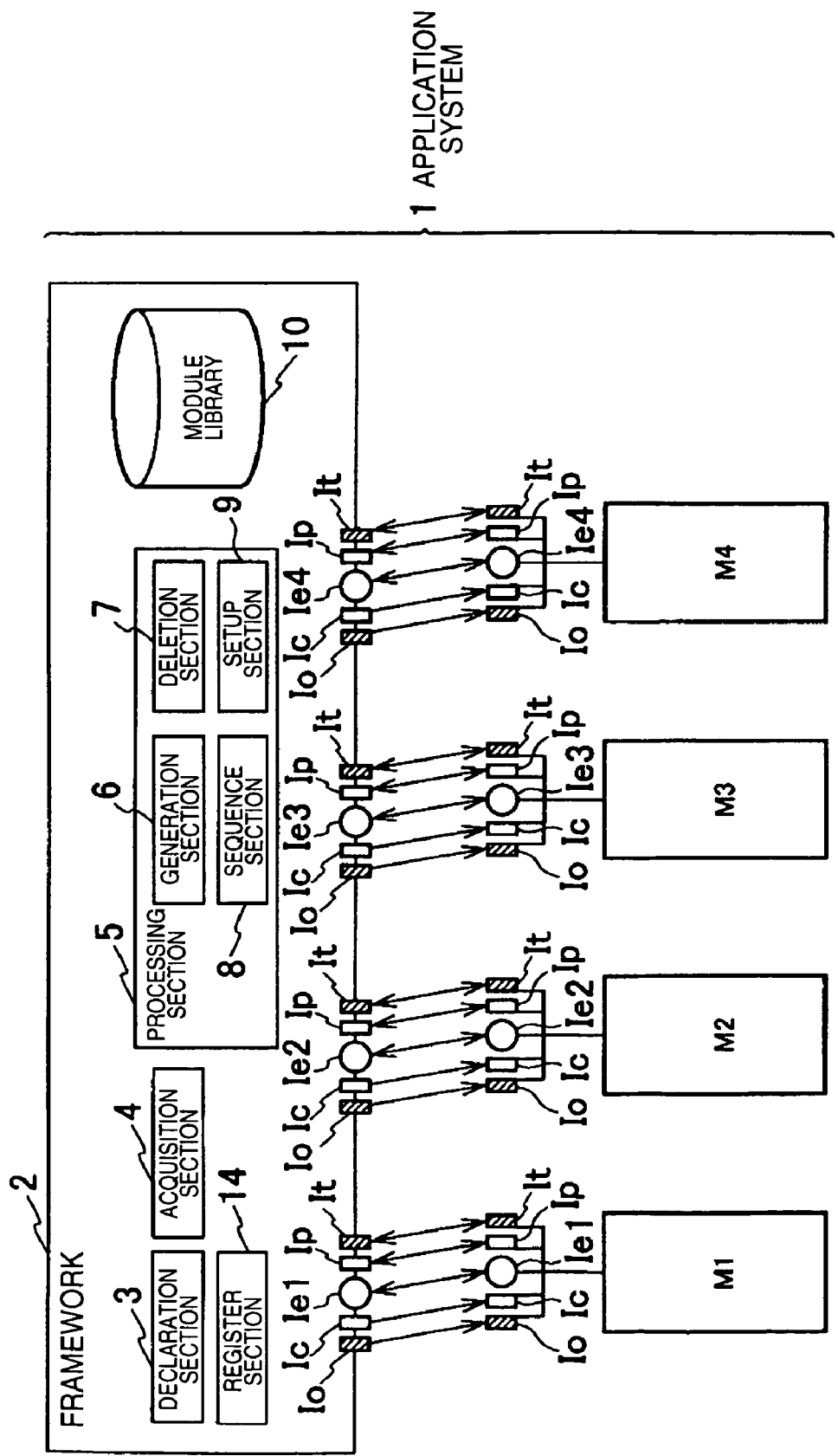
FIG. 14 is a configuration diagram of an application system according to the second embodiment in a midway condition of a plug-in method.

As shown in FIGS. 13 and 14, a software plug-in method according to a second embodiment is different in that the plurality of modules M1-M4 is connected to the framework 2 at the same time, in comparison with the plug-in method of the first embodiment shown in FIGS. 7 and 8. In other words, they are different in the point regarding the connection between the modules M1-M4 and the framework 2, namely in the plug-in method of the first embodiment, the modules M1-M4 are dynamically connected to the framework 2 by replacing the modules M1-M4 with each other or by switching the modules M1-M4 to each other, while in the plug-in method of the second embodiment, there is no need for replacing the modules M1-M4 with each other, and the connections between the modules M1-M4 and the framework 2 are static.

In step S1 in FIG. 6, based on the module library 10 and the sequence provided to the sequence section 8 shown in FIG. 1, the framework 2 registers the function pointers M1_QueryInterface( ) through M4_QueryInterface( ) as the entry names of the entry interfaces Ie1 through Ie4 provided respectively to the modules M1-M4 of a plurality of software necessary for realizing the function of the application system 1. As shown in FIG. 13, it becomes possible for the framework 2 to acquire the operation interfaces Io, Ic, Ip, and It of each of the modules M1-M4 by calling the entry interfaces Ie1 through Ie4 expressed with functions from the function pointers of M1_QueryInterface( ) through M4_QueryInterface( ).

In step S2, the function pointer types of the operation interfaces Io, Ic, Ip, and It of each of the modules M1-M4 are declared. The functions of CodecOpen, CodecClose, CodecProperty, and CodecTranslateData corresponding to the operation interfaces Io, Ic, Ip, and It, respectively, are declared and defined for each of the modules M1-M4.

In step S3, the entry interfaces Ie1 through Ie4 are calld based on the function pointers of M1_QueryInterface( ) through M4_QueryInterface( ) of the entry interfaces Ie1 through Ie4, respectively. According to this call operation, the framework 2 acquires the function pointers Open( ), Close( ), Property( ), and TranslateData( ), which are the operation names (static entries) of the operation interfaces Io, Ic, Ip, and It, respectively, provided to each of the modules M1-M4. As a result of this acquisition operation, the framework 2 calls the operation interfaces Io, Ic, Ip, and It of the module M2 based on the function pointers Open( ), Close( ), Property( ), and TranslateData( ), respectively. As shown in FIG. 14, since the operation interfaces Io, Ic, Ip, and It of each of the modules M1-M4 are connected to the framework 2, each of the modules M1-M4 and the framework 2 are connected to each other, it becomes that the software of each of the modules M1-M4 can be executed under the control of the framework 2.

In step S4, the execution process of the software of each of the modules M1-M4 is performed in accordance with the sequence of the sequence section using the operation interfaces Io, Ic, Ip, and It of each of the modules M1-M4. Each of the modules M1-M4 executes generation of that of the modules M1-M4 itself to be connected to the framework 2, a process inherent in that of modules M1-M4, and deletion of that of modules M1-M4 itself connected to the framework 2. Note that the execution of the deletion of that of the modules M1-M4 itself can be eliminated depending on the sequence. This is because there is no need for switching the connection of the modules M1-M4 with the framework 2 unlike with the first embodiment.

As described above, also in the plug-in method of the second embodiment, the software of the modules M1-M4 can be executed in accordance with the sequence so as to achieve the function as the application system 1 shown in FIG. 1.

And, also in the second embodiment, similar to the first embodiment, the identification names M1_QueryInterface( ) through M4_QueryInterface( ) of the entry interfaces Ie1 through Ie4 of the respective modules M1-M4 are specific to each of the modules M1-M4. Further, the identification names Open( ), Close( ), Property( ), and TranslateData( ) of the operation interfaces Io, Ic, Ip, and It of each of the modules M1-M4 are not specific to each of the modules M1-M4, but in common thereto. By thus unifying the identification names of the operation interfaces, the module library 10 does not become complicated with the operation interfaces.

Third Embodiment

Figure 15:
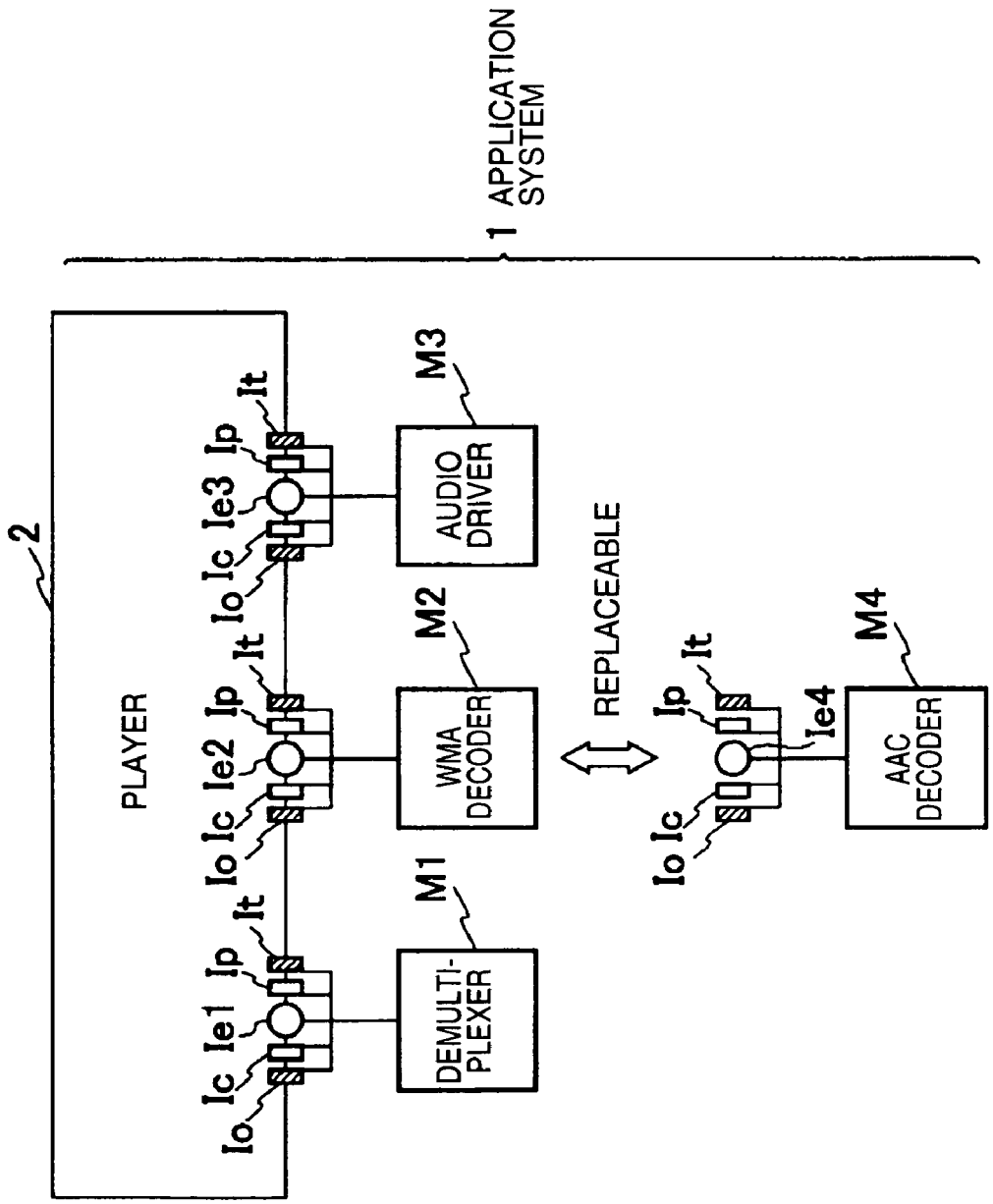
FIG. 15 is a configuration diagram of an application system (a player) according to a third embodiment.

As shown in FIG. 15, a third embodiment is a case in which the application system 1 in the first and the second embodiments is applied to a sound playback device. The player 2 corresponds to the framework 2 in the first and second embodiments. A demultiplexer M1 corresponds to the software module M1 in the first and the second embodiments. A WMA decoder M2 corresponds to the software module M2 in the first and the second embodiments. An audio driver M3 corresponds to the software module M3 in the first and the second embodiments. An AAC decoder M4 corresponds to the software module M4 in the first and the second embodiments.

The demultiplexer M1, the WMA decoder M2, the audio driver M3, and the AAC decoder M4 are each provided with the Open interface Io, the Close interface Ic, respective one of the entry interfaces Ie1 through Ie4, the Property interface Ip, and the TranslateData interface It.

Figure 16:
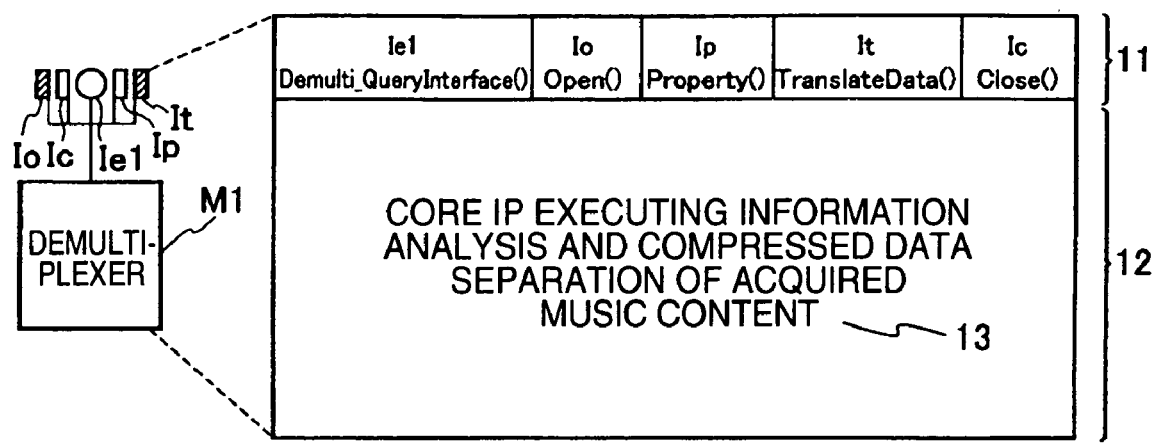
FIG. 16 is a diagram showing a hierarchical structure of a software module (a demultiplexer) according to the third embodiment.

As shown in FIG. 16, the demultiplexer M1 has a hierarchical structure including the interface layer 11 and the core layer 12 disposed therein as is the case with the first embodiment shown in FIG. 2. The interface layer 11 is disposed in the top layer of the hierarchical structure, namely the upper layer of the core layer 12. In the interface layer, there are disposed the Open interface Io, the Close interface Ic, the entry interface Ie1, a Property interface Ip, and the TranslateData interface It. In the core layer 12, there is disposed a core IP 13, which is software functioning as the demultiplexer M1, for performing information analysis and compressed data separation on acquired music content. The entry interface Ie1 has a function pointer of Demulti_QueryInterface( ) as a unique name for the framework 2 to identify the entry interface Ie1. The Open interface Io has a function pointer of Open ( ) for the entry interface Ie1 to identify the Open interface Io from the operation interfaces connectable to the demultiplexer M1. The Property interface Ip has a function pointer of Property( ) for the entry interface Ie1 to identify the Property interface Ip from the operation interfaces connectable to the demultiplexer M1. The TranslateData interface It has a function pointer of TranslateData( ) for the entry interface Ie1 to identify the TranslateData interface It from the operation interfaces connectable to the demultiplexer M1. The Close interface Ic has a function pointer of Close( ) for the entry interface Ie1 to identify the Close interface Ic from the operation interfaces connectable to the demultiplexer M1.

Figure 17:
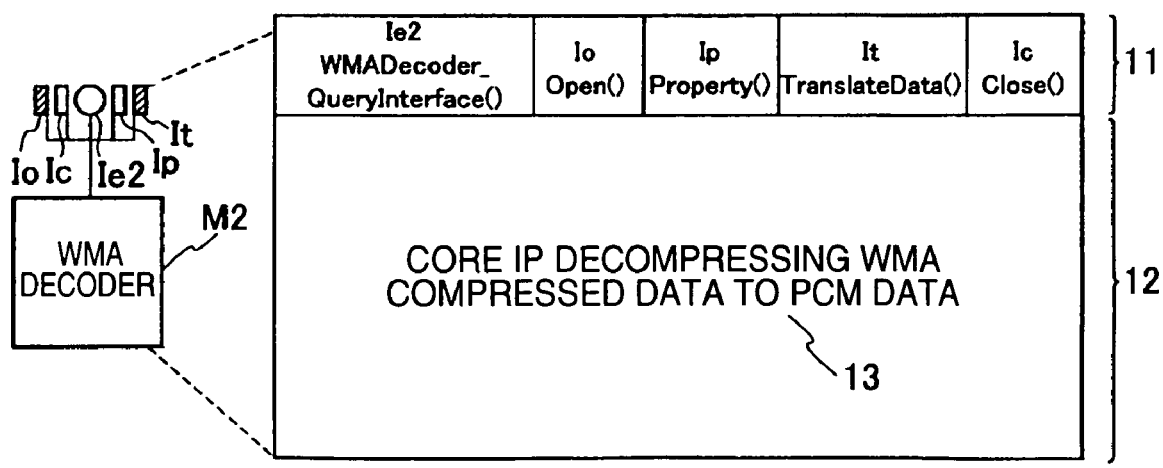
FIG. 17 is a diagram showing a hierarchical structure of a software module (a WMA decoder) according to the third embodiment.

As shown in FIG. 17, the WMA decoder M2 also has a similar hierarchical structure to the demultiplexer M1, but the function pointer WMADecoder_QueryInterface( ) as the entry name of the entry interface Ie2 is different form the function pointer Demulti_QueryInterface( ) of the entry interface Ie1. In the core layer 12, there is disposed a core IP 13, which is software functioning as the WMA decoder M2, for decompressing WMA compressed data to PCM data.

Figure 18:
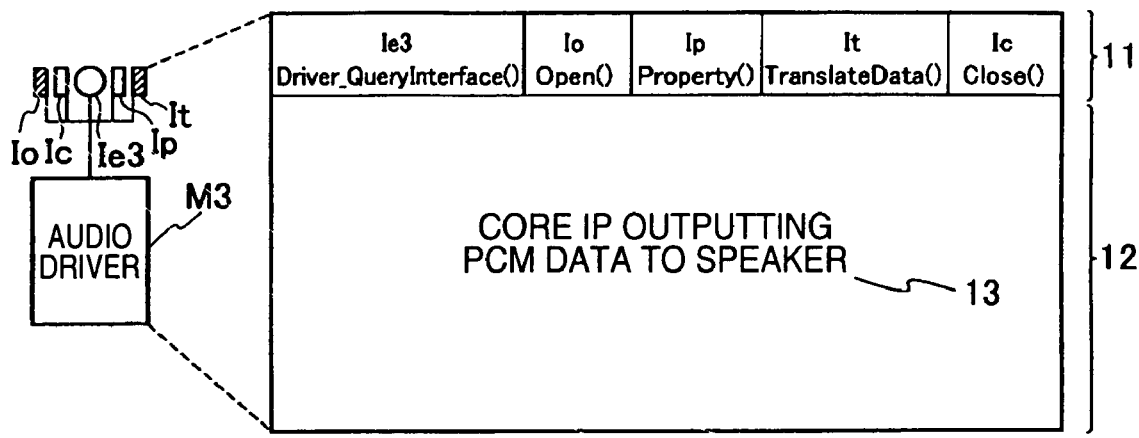
FIG. 18 is a diagram showing a hierarchical structure of a software module (an audio driver) according to the third embodiment.

As shown in FIG. 18, the audio driver M3 also has a similar hierarchical structure to the demultiplexer M1, but the function pointer Driver_QueryInterface( ) as the entry name of the entry interface Ie3 is different form the function pointer Demulti_QueryInterface( ) of the entry interface Ie1. In the core layer 12, there is disposed a core IP 13, which is software functioning as the audio driver M3, for outputting the PCM data to a speaker.

Figure 19:
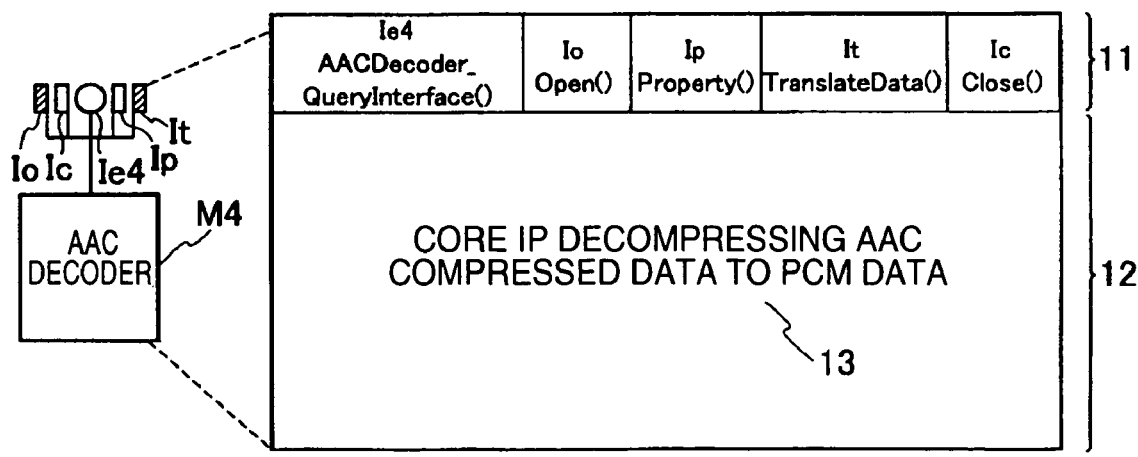
FIG. 19 is a diagram showing a hierarchical structure of a software module (a AAC decoder) according to the third embodiment.

As shown in FIG. 19, the AAC decoder M2 also has a similar hierarchical structure to the demultiplexer M1, but the function pointer AACDecoder_QueryInterface( ) as the entry name of the entry interface Ie4 is different form the function pointer Demulti_QueryInterface( ) of the entry interface Ie1. In the core layer 12, there is disposed a core IP 13, which is software functioning as the AAC decoder M4, for decompressing the AAC compressed data to the PCM data.

Note that, if the modules M1-M4 shown in FIGS. 16 through 19 are switched, the function pointers of Property( ), Open( ), Close( ), and TranslateData( ) are not switched, and the same function pointers of Property( ), Open( ), Close( ), and TranslateData ( ) are not switched are set.

Also in the application system 1 in the third embodiment, as explained with regard to the second embodiment, a plurality of modules M1 through M3 is simultaneously connected to the framework 2. Also in the plug-in method of the third embodiment, as explained with regard to the second embodiment, the software of the demultiplexer M1, the WMA decoder M2, and the audio driver M3 can be executed using the application system 1 of the third embodiment in the order of the sequence, namely the demultiplexer M1, the WMA decoder M2, and then the audio driver M3, so that the sound playback function as the application system 1 shown in FIG. 15 is achieved. And, the application system 1 of the third embodiment can thus play back the sound data compressed with the WMA format.

Further, in the application system 1 of the third embodiment, similarly to the first embodiment in which the modules M1 and M2 are switched to each other, the connection to the framework 2 can be switched between the plural modules M2 and M4. By using the application system 1 of the third embodiment, according to the plug-in method of the third embodiment, as explained with regard to the first embodiment, either one of the WMA decoder M2 and the AAC decoder M4 is connected to the player 2 in accordance with the sequence for selecting one of the WMA decoder M2 and the AAC decoder M4 so that the function of decompressing the sound compressed data with corresponding compression format, which is a part of the sound playback function as the application system 1 shown in FIG. 15, is achieved. And, if the selected module is the WMA decoder M2, the sound data compressed with the WMA format can be played back in accordance further to the sequence having the order of: the demultiplexer M1, the WMA decoder M2, and then the audio driver M3, on the one hand. On the other hand, if the selected module is the AAC decoder M4, the sound data compressed with the AAC format can be played back in accordance further to the sequence having the order of: the demultiplexer M1, the AAC decoder M4, and then the audio driver M3.

As described above, when the conversion format of the compressed sound data is changed in the application system 1 of the third embodiment, there is no need for modifying the configuration of the player 2, but it is enough only to switch between the WMA decoder M2 and the AAC decoder M4. And, the switching between the WMA decoder M2 and the AAC decoder M4 can be carried out simply by changing the function pointer WMADecoder_QueryInterface( ) as the entry name of the entry interface Ie2 of the WMA decoder M2 and the function pointer AACDecoder_QueryInterface( ) as the entry name of the entry interface Ie4 of the AAC decoder M4 with each other. As described above, according to the application system 1 of the third embodiment, it becomes easy to change the conversion format of the compressed sound data.

Fourth Embodiment

Figure 20:
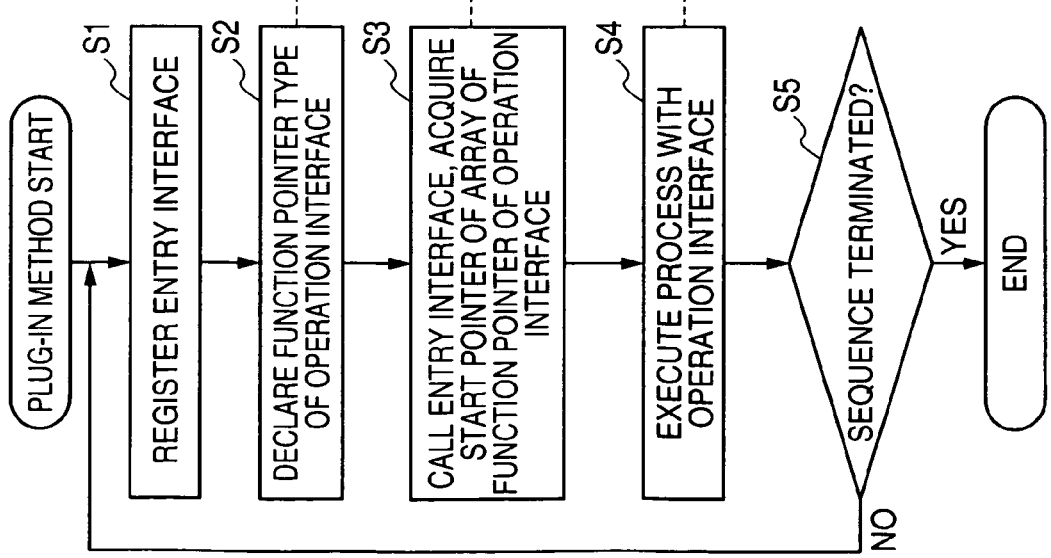
FIG. 20 is a flowchart of a plug-in method according to a fourth embodiment.

As shown in FIG. 20, a software plug-in method according to a fourth embodiment is different in the method of acquiring the interface in comparison with the plug-in method of the first embodiment shown in FIG. 1. In other words, they are different regarding the acquisition of the operation interface in that, in the plug-in method of the first embodiment, the function pointer of the operation interface is acquired by designation the operation name (static entry) as the argument of the entry interface, while in the plug-in method of the fourth embodiment, the leading pointer of the function pointer array of the operation interfaces is acquired by calling the entry interface.

A software plug-in method by the application system 1 shown in FIG. 1 will be explained. As an example, the case will be explained in which software built in the module M1 is added to the framework 2 as plug-in software, and then software built in the module M2 is subsequently added to the framework 2 as plug-in software.

As shown in FIG. 21, the function pointer of the operation interface is defined as an array in the plug-in interface. It is assumed that the entry interface returns the leading pointer of the array.

As shown in FIG. 20, in the software plug-in method, firstly in step S1, the register section 14 shown in FIG. 1 registers the function pointer M1_QueryInterface( ) as the entry name of the entry interface Ie1 provided to the software module M1 to the framework 2 based on the module library 10. It becomes possible for the framework 2 to acquire the operation interfaces Io, Ic, Ip, and It by calling the entry interface Ie1 expressed as a function from the function pointer M1_QueryInterface( ).

The declaration section 3 declares function pointer types of the operation interfaces Io, Ic, Ip, and It of the module M1 in step S2 as shown in the example of a function pointer type declaration with C in FIG. 20. Note that, since the input/output processes performed by each of the operation interfaces Io, Ic, Ip, and It can also be thought to be so-called functions, functions of CodecOpen, CodecClose, CodecProperty, and CodecTranslateData corresponding respectively to the operation interfaces Io, Ic, Ip, and It are declared and defined. According to these declarations, what kind of output data the framework 2 outputs and what kind of input data the framework 2 inputs are clarified in each of the operation interfaces Io, Ic, Ip, and It, and as shown in FIG. 7, the framework 2 becomes ready for connecting to the interfaces Ie1, Io, Ic, Ip, and It.

In step S3, the acquisition section 4 calls the entry interface Ie1 based on the function pointer M1_QueryInterface( ) of the entry interface Ie1. According to this call operation, the framework 2 acquires the leading pointer of the array of the function pointers Open( ), Close( ), Property( ), and TranslateData( ), which are the operation names (static entries) of the operation interfaces Io, Ic, Ip, and It, respectively, provided to the module M1. As a result of this acquisition operation, the framework 2 calls the operation interfaces Io, Ic, Ip, and It based on the function pointers Open( ), Close( ), Property( ), and TranslateData( ), respectively. As shown in FIG. 8, by connecting the operation interfaces Io, Ic, Ip, and It to the framework 2, the module M1 and the framework 2 are connected to each other, and it becomes possible to operate the software of the module M1 under the control of the framework 2. Note that, according to an example of the operation interface function pointer acquisition with C shown in FIG. 20, the framework 2 can acquire the functions CodecOpen, CodecClose, CodecProperty, and CodecTranslateData by calling the function query_interface( ) of the entry interface, and casting the acquired leading pointer of the array of the operation interfaces to the pointer of the structure including the declared function pointer as the member.

In step S4, the processing section 5 performs an execution process of the software of the module M1 using the operation interfaces Io, Ic, Ip, and It. Under the control of the processing section 5, the module M1 executes generation of the module M1 itself to be connected to the framework 2, a process inherent in the module M1, and deletion of the module M1 itself connected to the framework 2.

As described above, since it is designed that the array of the function pointers of the operation interface is defined by the plug-in interface side, and the leading pointer of the array is returned by the entry interface, it becomes enough for acquiring the function pointers of the operation interfaces in the application side to call the entry interface. Thus, the operation interface can easily be acquired.

Fifth Embodiment

In the embodiments described above, there are explained that the application system 1 is implemented as a software system performed on the computer system 100. However, the application system 1 may be implemented as a hardware system as described in below.

Herein, a semiconductor device 200 is described with reference to FIG. 23 as an example for implementing the application system 1 as a hardware device.

The semiconductor device 200 is a so-called multimedia chip that decodes a plurality of types of multimedia data such as an AAC data, MPEG data, and JPEG data.

Figure 23:
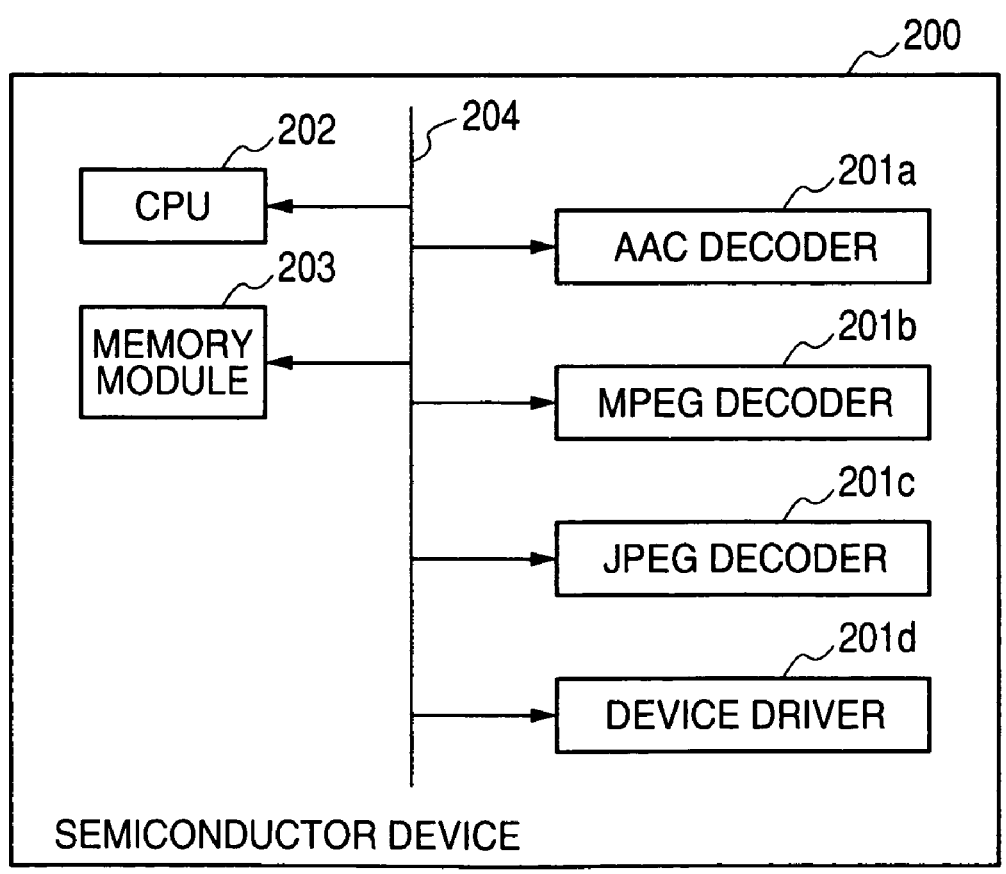
FIG. 23 is schematic block diagram of a semiconductor device according to a fifth embodiment.

As shown in FIG. 23, the semiconductor device 200 includes: a plurality of data processing modules 201a, 201b, 201c, and 201d (which will be collectively referred to as a data processing module 201 in below); a CPU (controller) 202 that controls the data processing modules 201; a memory module 203 that provides a work area for the data processing modules 201 and the CPU 202; and a bus 204 that allows the CPU 202 to access to the data processing modules 201 and the memory module 203.

Each of the data processing modules 201 are implemented as a hardware module that performs data processing, and respectively decodes one type of multimedia data such as AAC data (with AAC decoder 201a), MPEG data (with MPEG decoder 201b), JPEG data (with JPEG decoder 201c).

The data processing modules 201a-201c are configured as such described with reference to FIGS. 16, 17 and 19, and perform data processing including data conversion for converting the input data into the output data.

The data processing module 201d (device driver 201d) is configured as such described with reference to FIG. 18, and performs control processing that includes no data conversion. The device driver 201d is provided for controlling an external output device, such as a speaker system or a display unit.

In the embodiment, the middleware core (core module) 13, which is described as a software module in the first to fourth embodiment, is provided as a semiconductor circuit.

In the embodiment, the data processing modules 201 may be provided with an independent memory device for allocating the address space, instead of allocating the address space in the memory module 203.

As described with reference to the embodiments, there is provided a semiconductor device, a system for performing data processing, and method for performing communication between a software framework and a plurality of software modules, which are capable of preventing the unique name of a pointer connectable to an interface of a module from becoming complicated. Further, an application system capable of preventing the unique name of a pointer connectable to an interface of a module from becoming complicated can also be provided.

The foregoing description of the embodiments has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A semiconductor device comprising:
 a plurality of data processing modules;
 a controller that performs a framework process and controls the data processing modules;
 a memory module that provides a work area for the data processing modules and the controller; and
 a bus that allows the controller to access to the data processing modules and the memory module,
 wherein each of the data processing modules comprises:
  a core module that performs data processing on input data and generates output data;
  an operation interface that receives the input data and outputs the output data; and
  a query interface that notifies static entry of the operation interface to the framework process,
 wherein the controller performs procedures comprising:
 registering an entry name of the query interface with respect to each of the data processing modules to the framework process;
 issuing a query from the framework process to the query interface in any one of the data processing modules based on the registered entry name;
 obtaining the static entry by the framework process from the query interface; and
 accessing the operation interface of the data processing modules by the framework process based on the obtained static entry.

2. The semiconductor device according to claim 1, wherein the operation interface receives parameter data to be used in the data processing performed by the core module from the framework process, and outputs information regarding the core module to the framework process.

3. The semiconductor device according to claim 1, wherein the operation interface initializes an environment and a state for the data processing performed by the core module, and releases the environment, in accordance with a request made by the framework process.

4. The semiconductor device according to claim 3, wherein the operation interface connects the core module with the framework process, and terminates the data processing performed by the core module, in accordance with the request made by the framework process.

5. The semiconductor device according to claim 3, wherein the operation interface allocates an address space in a memory device and sets parameter data necessary for the data processing to a default value, in accordance with the request made by the framework process.

6. The semiconductor device according to claim 5, wherein one or more of the data processing modules further comprises the memory device.

7. The semiconductor device according to claim 5, wherein the operation interface allocates the address space in the memory module as the memory device.

8. The semiconductor device according to claim 5, wherein the operation interface releases the allocated address space, in accordance with a request made by the framework process.

9. The semiconductor device according to claim 1, wherein the operation interface receives parameter data to be used in the data processing, the parameter data being defined by a character string or a numerical string.

10. The semiconductor device according to claim 1, wherein the controller issues the query from the framework process to the query interface in a first data processing module included in the data processing modules, after terminating the access to the operation interface of a second data processing module included in the data processing modules, by disconnecting the second data processing module from the controller.

11. The semiconductor device according to claim 1, wherein the static entry of the operation interface in each of the data processing modules is configured to be identical with one another for any of the data processing modules.

12. A system for performing data processing, comprising:
a plurality of software modules;
a software framework that communicates with the software modules;
a processing unit that performs procedures in accordance with the software framework and the software modules; and
a memory that provides a work area for the software modules and the processing unit,
wherein each of the software modules includes:
a core module to perform data processing on input data and to generate output data;
an operation interface to receive the input data and to output the output data; and
a query interface to notify static entry of the operation interface to the framework process,
wherein the software framework causes the processing unit to perform procedures including:
registering an entry name of the query interface with respect to each of the data processing modules to the framework process;
issuing a query from the framework process to the query interface in any one of the data processing modules based on the registered entry name;
obtaining the static entry by the framework process from the query interface; and
accessing the operation interface of the data processing modules by the framework process based on the obtained static entry.

13. The system according to claim 12, wherein the operation interface receives parameter data to be used in the data processing performed by the core module from the software framework, and outputs information regarding the core module to the software framework.

14. The system according to claim 12, wherein the operation interface initializes an environment and a state for the data processing performed by the core module, and releases the environment, in accordance with a request made by the software framework.

15. The system according to claim 14, wherein the operation interface connects the core module with the software framework, and terminates the data processing performed by the core module, in accordance with the request made by the software framework.

16. The system according to claim 14, wherein the operation interface allocates an address space in the memory and sets parameter data necessary for the data processing to a default value, in accordance with the request made by the software framework.

17. The system according to claim 14, wherein the operation interface releases the allocated address space, in accordance with a request made by the software framework.

18. The system according to claim 12, wherein the operation interface receives parameter data to be used in the data processing, the parameter data being defined by a character string or a numerical string.

19. The system according to claim 12, wherein the processing unit issues the query from the software framework to the query interface in a first data processing module included in the data processing modules, after terminating the access to the operation interface of a second data processing module included in the data processing modules, by disconnecting the second data processing module from the software framework.

20. The system according to claim 12, wherein the static entry of the operation interface in each of the data processing modules is configured to be identical with one another for any of the data processing modules.

21. A method for performing communication between a software framework and a plurality of software modules, wherein each of the software modules includes a core module to perform data processing on input data and generates output data; an operation interface to receive the input data and to output the output data; and a query interface to notify static entry of the operation interface to a framework process, wherein the method comprises:
registering, by a computer processing unit, an entry name of the query interface with respect to each of the software modules to the framework process;
issuing a query from the framework process to the query interface in any one of the software modules based on the registered entry name;
obtaining the static entry by the framework process from the query interface; and
accessing the operation interface of the software modules by the framework process based on the obtained static entry.

* * * * *